(12) United States Patent
Martino

(10) Patent No.: US 10,542,829 B2
(45) Date of Patent: Jan. 28, 2020

(54) JEWELRY ORGANIZER

(71) Applicant: Marc G. Martino, Westlake Village, CA (US)

(72) Inventor: Marc G. Martino, Westlake Village, CA (US)

(*) Notice: Subject to any disclaimer, the term of this patent is extended or adjusted under 35 U.S.C. 154(b) by 0 days.

(21) Appl. No.: 15/810,146

(22) Filed: Nov. 13, 2017

(65) Prior Publication Data

US 2018/0098643 A1 Apr. 12, 2018

Related U.S. Application Data

(63) Continuation-in-part of application No. 14/294,591, filed on Jun. 3, 2014, now Pat. No. 9,814,328, which
(Continued)

(51) Int. Cl.
*A47F 5/08* (2006.01)
*A63H 3/52* (2006.01)
(Continued)

(52) U.S. Cl.
CPC ............ *A47F 5/0807* (2013.01); *A41D 27/20* (2013.01); *A47F 7/02* (2013.01); *A63H 3/52* (2013.01);
(Continued)

(58) Field of Classification Search
CPC ........ A47F 5/0807; A47F 7/02; A47F 5/0876; A47F 7/022; A47F 7/024; A41D 27/20; A63H 3/52; A63H 18/02; A63H 18/04; A63H 19/30; B63B 35/79; B63B 2035/7903; B63H 1/36; B63H 16/18; B63H 1/36; F16B 1/00; F16B 2001/0035; F41B 6/003; F41B 7/08; F41B 11/89; F42B 6/006; F42B 6/10; F42B 10/26; F42B 10/34; F01N 13/082; F01N 2260/06; A47G 201/0672; A47G 2200/10; A47G 200/103;
(Continued)

(56) References Cited

U.S. PATENT DOCUMENTS 2,733,113 A * 1/1956 Humbargar .......... A47B 81/007
206/45.24
2,798,241 A * 7/1957 Cohen .................... A46B 15/00
132/309
(Continued)

*Primary Examiner* — Jennifer E. Novosad
(74) *Attorney, Agent, or Firm* — Marc Martino

(57) ABSTRACT

A jewelry display includes a ferromagnetic planar substrate having a front surface opposite a back surface. A bracket is configured to be attached to a wall, the bracket comprising at least one bracket magnet which is a permanent magnet. The back surface of the ferromagnetic planar substrate is configured to removably attach to the bracket due to the magnetic force of the at least one bracket magnet. A plurality of jewelry fixtures are configured to be removably attached to the front surface of the ferromagnetic planar substrate. Each jewelry fixture includes at least one permanent fixture magnet and a jewelry holding structure. The at least one permanent fixture magnet of each jewelry fixture is magnetically attracted to the ferromagnetic planar substrate. The at least one bracket magnet may be at least 2, 5, 10 times or more as powerful as the at least one permanent fixture magnet.

18 Claims, 19 Drawing Sheets

Related U.S. Application Data is a continuation of application No. 13/456,213, filed on Apr. 26, 2012, now Pat. No. 8,763,551.

(60) Provisional application No. 61/480,645, filed on Apr. 29, 2011.

(51) Int. Cl.
| | |
|---|---|
| *A63H 18/04* | (2006.01) |
| *F16B 1/00* | (2006.01) |
| *A47F 7/02* | (2006.01) |
| *A41D 27/20* | (2006.01) |
| *B63H 1/36* | (2006.01) |
| *B63H 16/18* | (2006.01) |
| *B63B 35/79* | (2006.01) |
| *F41B 11/89* | (2013.01) |
| *F01N 13/08* | (2010.01) |

(52) U.S. Cl.
CPC .............. *A63H 18/04* (2013.01); *B63B 35/79* (2013.01); *B63H 1/36* (2013.01); *B63H 16/18* (2013.01); *F16B 1/00* (2013.01); *B63B 2035/7903* (2013.01); *F01N 13/082* (2013.01); *F01N 2260/06* (2013.01); *F16B 2001/0035* (2013.01); *F41B 11/89* (2013.01)

(58) Field of Classification Search
CPC ............... A47G 2200/106; A47G 1/17; A47G 2009/004; Y10S 211/01; A47B 2096/209
USPC ............... 211/85.2, 59.1, 193, 87.01, 86.01, 211/DIG. 1; 206/6.1; 248/683, 350, 248/206.5, 205.3, 304, 317, 339, 489, 248/497, 690, 309.4
See application file for complete search history.

(56) References Cited

U.S. PATENT DOCUMENTS

| | | | | |
|---|---|---|---|---|
| 3,314,634 A * | 4/1967 | Carter | ............... | H01F 7/0252 211/39 |
| 3,464,134 A * | 9/1969 | Franklin | ............... | G09F 7/04 40/621 |
| 4,175,660 A * | 11/1979 | Feibelman | ............... | B65D 73/00 206/461 |
| 4,609,173 A * | 9/1986 | Belokin | ............... | A47K 10/12 211/105.1 |
| 4,616,796 A * | 10/1986 | Inoue | ............... | B23Q 3/1546 248/206.5 |
| 4,905,847 A * | 3/1990 | Hanson | ............... | A47B 57/58 211/184 |
| 4,953,714 A * | 9/1990 | Paul | ............... | A47F 5/0884 211/36 |
| 5,031,777 A * | 7/1991 | Knox | ............... | A47F 5/00 211/163 |
| 5,301,822 A * | 4/1994 | Coleman | ............... | B25H 3/04 211/70.6 |
| 5,303,895 A * | 4/1994 | Hart | ............... | A47G 1/168 248/475.1 |
| 5,306,467 A * | 4/1994 | Douglas-Hamilton | ... | B01L 9/50 211/DIG. 1 |
| 5,377,820 A * | 1/1995 | Christman | ............... | A47F 5/0807 206/495 |
| 5,639,138 A * | 6/1997 | Smith | ............... | A47F 5/08 211/195 |
| 5,671,849 A * | 9/1997 | Bacon | ............... | A47F 7/02 206/6.1 |
| 5,746,329 A * | 5/1998 | Rondeau | ............... | A47G 1/17 211/123 |
| 5,903,869 A * | 5/1999 | Jacobson | ............... | A47G 29/122 248/205.3 |
| 5,921,407 A * | 7/1999 | Kabanek | ............... | A61B 50/20 211/65 |
| 6,085,916 A * | 7/2000 | Kovacevic | ............... | A47F 7/24 211/86.01 |
| 6,216,888 B1 * | 4/2001 | Chien | ............... | B23Q 3/1546 211/70.6 |
| 6,626,303 B1 * | 9/2003 | Moodie | ............... | A47F 5/0807 211/70.7 |
| 6,811,127 B1 * | 11/2004 | Shiao | ............... | B25H 3/04 211/70.6 |
| 7,073,672 B2 * | 7/2006 | Sholem | ............... | B25H 3/04 211/70.6 |
| 7,264,515 B1 * | 9/2007 | Rubinstein | ............... | H01R 13/746 211/85.2 |
| 7,431,251 B2 * | 10/2008 | Carnevali | ............... | F16M 13/00 224/183 |
| 7,582,828 B2 * | 9/2009 | Ryan | ............... | H05K 5/0204 174/481 |
| 7,641,058 B2 * | 1/2010 | Silverman | ............... | B05B 15/62 211/66 |
| 7,971,737 B2 * | 7/2011 | Newbould | ............... | A47B 96/027 211/119.009 |
| 8,777,025 B1 * | 7/2014 | Buckleitner | ............... | A47F 5/04 211/13.1 |
| 8,870,143 B2 * | 10/2014 | Kubin | ............... | F16M 13/04 248/222.52 |
| 9,038,971 B1 * | 5/2015 | Guthrie | ............... | F16M 13/022 248/121 |
| 9,814,328 B2 * | 11/2017 | Martino | ............... | A47F 5/0876 |
| 9,847,805 B2 * | 12/2017 | Sirichai | ............... | A45C 11/00 |
| 2004/0232291 A1 * | 11/2004 | Carnevali | ............... | F16M 13/00 248/206.5 |
| 2005/0109910 A1 * | 5/2005 | Vander Berg | ............... | A47B 96/027 248/477 |
| 2006/0226318 A1 * | 10/2006 | D'Amico | ............... | B25B 11/002 248/274.1 |
| 2009/0194650 A1 * | 8/2009 | Corvo | ............... | A47G 1/02 248/205.3 |
| 2009/0250575 A1 * | 10/2009 | Fullerton | ............... | G09F 7/04 248/206.5 |
| 2010/0163696 A1 * | 7/2010 | Briggs | ............... | A47B 96/061 248/206.5 |
| 2010/0276382 A1 * | 11/2010 | Antonioni | ............... | A47F 5/0807 211/59.2 |
| 2011/0290965 A1 * | 12/2011 | Virgin | ............... | G06F 1/1632 248/205.3 |
| 2014/0263116 A1 * | 9/2014 | Wojciechowski | .... | A47F 5/0807 211/85.2 |
| 2015/0128491 A1 * | 5/2015 | Aller | ............... | A01G 9/022 47/65.5 |
| 2016/0149386 A1 * | 5/2016 | Stechmann | ............... | H02G 3/32 248/68.1 |

* cited by examiner

JEWELRY ORGANIZER

CROSS-REFERENCE TO RELATED APPLICATIONS

This continuation-in-part application claims priority to continuation application Ser. No. 14/294,591 filed on Jun. 3, 2014, which itself claims priority to non-provisional patent application Ser. No. 13/456,213 filed on Apr. 26, 2012 (now U.S. Pat. No. 8,763,551 issued on Jul. 1, 2014), which itself claimed priority to provisional patent application No. 61/480,645, filed on Apr. 29, 2011, the contents of which all applications herein are incorporated in full with these references.

DESCRIPTION

Field of the Invention

The present invention relates in general to a jewelry organizer, and in particular to a wall mounted jewelry organizer that allows the user to easily see and configure one's jewelry.

Background of the Invention

This application covers several different inventions. First, a dolphin board is a propulsion enhanced floatation device intended to be used in the surf and various waters in a manner similar to a boogie board. Second, waller coasters is a toy comprising a series of roller-coaster like tracks that can be selectively attached to a wall to create a roller coaster-like toy. Software can be used to design the track layout which allows the user to try various combinations before attempting to physically create a track structure. Third, a wall mounted doll house is designed to replace large three-dimensional doll houses which are expensive and take up a substantial amount of space. Fourth, an improved toy gun is disclosed with bullets that can fly further than existing foam bullet projectiles due to the bullets unique design and launcher. The launcher may also utilize magnetic propulsion. Fifth, the jewelry organizer is a way to visibly store and display jewelry in a selectively changeable way using a variety of positionable holders. Sixth, pocket jeans are a pair of jeans with integrated pockets that allow a person to easily store a variety of items eliminating the need for a purse or backpack. Contrary to cargo pants, the pockets are hidden from view and allow a person to carry multiple items discretely. Seventh, a ram-air exhaust increases the efficiency of an internal combustion engine by creating a venturi effect from a vehicle's movement which helps to pull exhaust fumes out through an exhaust pipe.

Accordingly, there is a need for improvements that all of the above-mentioned products satisfy. The present inventions fulfill these needs and provide other related advantages.

SUMMARY OF THE INVENTION

An exemplary embodiment of a jewelry display includes: a ferromagnetic planar substrate having a front surface opposite a back surface; a bracket configured to be attached to a wall, the bracket comprising at least one bracket magnet, wherein the at least one bracket magnet is a permanent magnet, and wherein the back surface of the ferromagnetic planar substrate is configured to removably attach to the bracket due to the magnetic force of the at least one bracket magnet; and a plurality of jewelry fixtures configured to be removably attached to the front surface of the ferromagnetic planar substrate, each jewelry fixture comprising at least one permanent fixture magnet and a jewelry holding structure, wherein the at least one permanent fixture magnet of each jewelry fixture is magnetically attracted to the ferromagnetic planar substrate.

In other exemplary embodiments, the at least one bracket magnet may comprise at least four bracket magnets.

A plurality of horizontally extending slots may be disposed through the bracket. A farthest left and right ends of the slots may be at least 16 or 32 inches apart.

A plurality of holes through the bracket and horizontally may be disposed next to one another. A farthest left and right hole of the plurality of holes may be at least 16 or 32 inches apart.

The at least one bracket magnet may be attached to an outer surface of the bracket, the outer surface configured to face away from the wall. Or, the at least one bracket magnet may be attached to an inner surface of the bracket, the inner surface configured to face towards the wall. Alternatively, the at least one bracket magnet may be over molded within the bracket.

The bracket may comprise a removable adhesive pad configured to attach the bracket to the wall.

The jewelry holding structure may comprise a ring fixture, a bracelet fixture, an earring fixture, a necklace fixture, a watch fixture, a bowl fixture or a shelf fixture. Each of the plurality of jewelry fixtures may comprise a protective pad configured to be disposed between the at least one permanent magnet and the ferromagnetic planar substrate. The protective pad may comprise a rubber material or a rubber-like material.

The at least one bracket magnet may be at least 2, 5 or 10 times as powerful as the at least one permanent fixture magnet.

An exemplary embodiment of a human powered watercraft includes a buoyant board body defined as including a top rider surface, a bottom submerged surface, a front section half, a rear section half, a board centerline and a board plane. The board centerline extends from the front section half to the rear section half and extends in-between and generally parallel to the top rider surface and the bottom submerged surface. The board plane is generally parallel to and in-between the top rider surface and the bottom submerged surface. A leg engagement mechanism is pivotally connected to the board body positioned generally along the rear section half. The leg engagement mechanism engages a human rider's legs while laying in a prone position on the top rider surface. A fin propulsion mechanism is pivotally connected to the board body positioned generally along the bottom submerged surface and mechanically coupled to the leg engagement mechanism, wherein pivoting the leg engagement mechanism pivots the fin propulsion mechanism.

The leg engagement mechanism may include a leg shaft, a rear ankle support and a front ankle support. The leg shaft may include a proximal leg shaft end and a distal leg shaft end. The leg shaft may be pivotally connected to the board body at the proximal leg shaft end. The rear ankle support and front ankle support may be connected to the leg shaft at the distal leg shaft end. The leg shaft may pivot about a leg shaft axis generally perpendicular to the board centerline and generally parallel to the board plane, such that engagement of a human rider's front ankle is against the front ankle support and engagement of a human rider's rear ankle is against the rear ankle support.

The fin propulsion mechanism may include a fin shaft and a fin. The fin shaft may include a proximal fin shaft end and a distal fin shaft end. The fin shaft may be pivotally connected to the board body at the proximal fin shaft end. The fin may be connected to the fin shaft at the distal fin shaft end. The fin shaft may pivot about a fin shaft axis generally perpendicular to the board centerline and generally parallel to the board body.

The leg engagement mechanism and the fin propulsion mechanism may be mechanically coupled using a connection link, wherein the connection link is pivotally connected to the fin shaft between the proximal fin shaft end and the distal fin shaft end and also pivotally connected to the leg shaft between the proximal leg shaft end and the distal leg shaft end. Additionally, the leg engagement mechanism and the fin propulsion mechanism may be mechanically coupled in a reduced ratio wherein the fin propulsion mechanism pivots a lesser degree of rotation than the leg engagement mechanism.

The fin may include a substantially flat fin and may be positioned generally parallel to the board plane and pivot about the fin shaft axis in a generally arcuate path moving in a direction generally to and away from the board plane. The fin may be pivotally connected to the distal fin shaft end by at least one pivotable fin linkage. The fin may include a flexible material.

The board body may be sufficiently buoyant in a water source to support the weight of the human powered watercraft and a human rider. The top rider surface is generally above the water source and sufficient in size to support the human rider in the prone position. The bottom submerged surface is generally below the water source.

The leg engagement mechanism and the fin propulsion mechanism may be mechanically coupled in a reduced ratio wherein the fin propulsion mechanism pivots a lesser degree of rotation than the leg engagement mechanism. The leg engagement mechanism and the fin propulsion mechanism may be mechanically coupled comprising a belt. The leg engagement mechanism and the fin propulsion mechanism may be mechanically coupled comprising gears.

Another exemplary embodiment of a watercraft includes a floatable board configured to accept a rider laying upon the board. A leg shaft is pivotally coupled to the board at a proximal leg shaft end. An ankle support is connected to a distal leg shaft end. A fin shaft is pivotally coupled to the board at a proximal fin shaft end. A fin is attached to a distal fin shaft end. A mechanical coupling is engaged to and between the leg shaft and fin shaft.

The mechanical coupling may include a connection link pivotally attached at opposite ends to the leg shaft and fin shaft. Alternatively, the mechanical coupling may include a belt pivotally connecting the leg shaft and fin shaft. Alternatively, the mechanical coupling may include a leg shaft gear engaging a fin shaft gear, where the leg shaft gear is disposed at the proximal leg shaft end and the fin shaft gear is disposed at the proximal fin shaft end.

An exemplary embodiment of a buoyant board for riding upon within water includes a board body including a top surface opposite a bottom surface, a leg shaft pivotally connected to the board body and pivotable generally along and above the top surface, a fin shaft pivotally connected to the board body and pivotable generally along and below the bottom surface, an ankle support disposed at a distal leg shaft end, and a fin disposed at a distal fin shaft end, wherein the leg shaft and fin shaft are mechanically coupled in pivotal motion.

A connection link may be pivotally attached to both the leg shaft and fin shaft. Alternatively, a belt may be pivotally connecting the leg shaft and fin shaft. Alternatively, a leg shaft gear may be attached at a proximal leg shaft end and a fin shaft gear attached at a proximal fin shaft end, wherein the leg shaft gear directly engages the fin shaft gear.

An exemplary embodiment of a watercraft powered by a rider includes a floatable board having a top side and a bottom side, wherein the top side is sufficient to accept the rider laying face down on the floatable board and wherein the bottom side is submerged below a water line. A leg extension bar is pivotally connected to the floatable board wherein the leg extension bar has a distal leg extension bar end and a proximal leg extension bar end where the proximal leg extension bar end is pivotally connected to the floatable board and where an ankle engagement fixture is attached at the distal leg extension bar end which interfaces with a rider's ankles. A fin extension bar is pivotally connected to the floatable board wherein the fin extension bar has a proximal fin extension bar end and a distal fin extension bar end where the proximal fin extension bar end is pivotally connected to the floatable board on the bottom side and allows the fin extension bar to travel in an arcuate path, and where a fin is attached at the distal fin extension bar end, thereby creating thrust. A means is included for mechanically coupling the leg extension bar to the fin extension bar. The means for mechanically coupling the leg extension bar to the fin extension bar may be accomplished with a reduction ratio wherein an amount of rotation of the leg extension bar results in a lesser rotation of the fin extension bar. The means for mechanically coupling the leg extension bar to the fin extension bar may be such that the leg extension bar and fin extension bar are both in a stowed position when both are substantially parallel to the top side and bottom side, wherein as the leg extension bar rotates away from the top side the fin extension bar simultaneously rotates away from the bottom side. The floatable board may be substantially shaped like a surfboard or like a boogie board.

An exemplary embodiment of a system for human propulsion of an aquatic vehicle includes a buoyant board having a top surface, a bottom surface, a front section and a rear section. A means for harnessing a movement of a rider's leg curl and extension is connected to the buoyant board along the rear section, wherein a rider is positioned in a prone position on the top surface of the buoyant board. A means for propelling the aquatic vehicle forward is connected to the bottom surface of the buoyant board including a fin which moves generally to and away from the bottom surface of the buoyant board thereby creating thrust. A means for mechanically coupling the movement of the rider's leg curl and extension to the movement of the fin is included. The means for mechanically coupling the movement of the rider's leg curl and extension to the movement of the fin may be achieved with a reduced ratio wherein the movement of the rider's leg curl and extension corresponds to less movement of the fin, thereby increasing a rider's leverage. The means for mechanically coupling the movement of the rider's leg curl and extension may fit entirely within the buoyant board such that the buoyant board has a slim profile.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Invention 1: Dolphin Board

Figure 1:
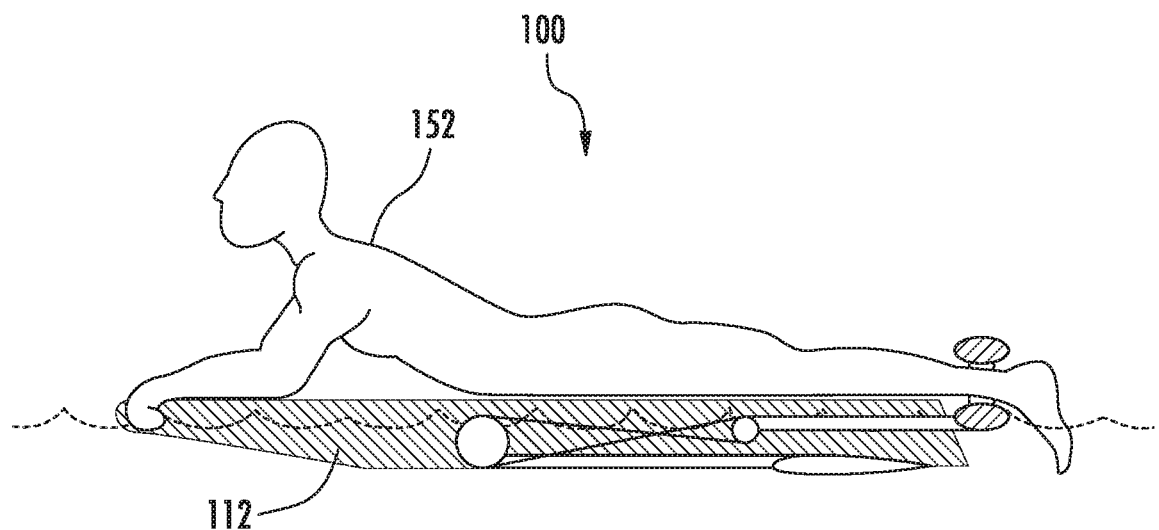
FIG. 1 is a side view of an exemplary dolphin board embodying the present invention.
Figure 2:
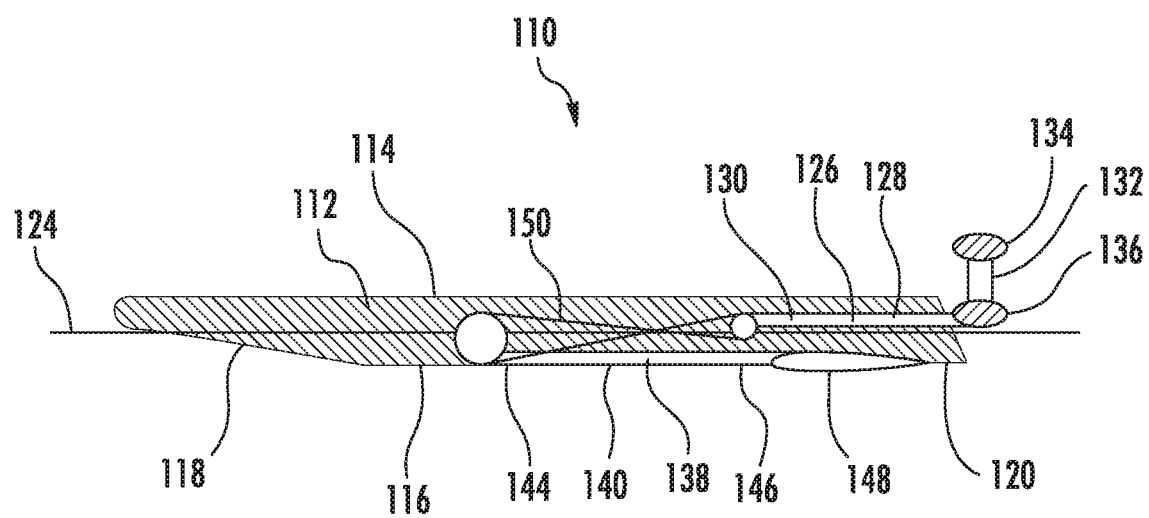
FIG. 2 is a side view of the structure of FIG. 1 without the rider.
Figure 3:
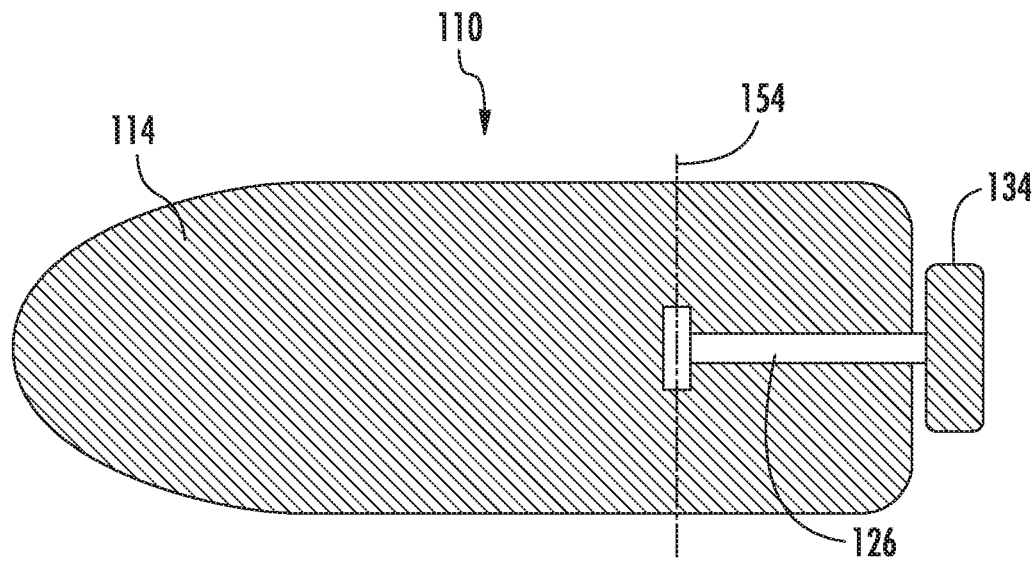
FIG. 3 is a top view of the structure of FIG. 1.

Many worldwide enjoy water related activities using surfboards, boogie boards, body boards and the like in swimming pools, lakes, rivers, and in the oceans. These buoyant boards are normally powered by the rider in a prone position, as the rider lies on his stomach on top of the board. The rider then creates propulsion by paddling with his hands. The arms are not the largest muscle group normally intended for propulsion, and after a short duration the rider can quickly tire. This is even more noticeable when paddling through the ocean surf, as much energy is needed to push through the surging waves. Furthermore, paddling in this manner also requires advanced balancing skills as the rider cannot simultaneously hold onto the board while paddling. This is especially apparent with smaller sized boards, where not all of the weight of the rider is supported by the board but rather hangs into the water, such as a boogie board. A need exists for channeling the human form into propulsion in a more efficient manner.

Some have attempted to create more efficient human powered watercraft, yet all are deviations from normal board use. Some have created kayaks which are peddle-driven, requiring the rider to sit in a recumbent position, not a prone position. Propulsion can be from a propeller or from a fin propulsion system mimicking various sea creatures like penguins, dolphins or sharks. Some have created board related watercraft yet require the rider to stand and pump a shaft. Standing on a board requires even more balance than necessary and doesn't allow the rider to create propulsion in a prone position. For all of the aforementioned reasons and others not discussed, a need exists to create a human powered watercraft for a rider in the prone position to efficiently channel the human form into propulsion.

The present invention relates in general to a human powered watercraft, and in particular to a human powered watercraft creating propulsion from a leg engagement mechanism mechanically coupled to a fin propulsion mechanism. This invention is generally referred to herein as the "dolphin board." In the following description of the exemplary embodiments, reference is made to the accompanying drawings that form a part hereof, and in which is shown merely by way of illustration. It is to be understood that other embodiments may be used and structural changes may be made without departing from the scope of the present invention.

An embodiment of a human powered watercraft 110 is shown in FIGS. 1-8. The human powered watercraft 110 has a board body 112 that may be may shaped like a surfboard, a boogie board, a body board or the like. The board body 112 is naturally buoyant, meaning it floats when placed in water. This buoyancy should be enough to support the human powered watercraft 110 and also supporting a rider 152. The board body 112 may be made of numerous different materials known today to achieve buoyancy. Similar to surfboards, boogie boards and flotation devices, the board body 112 may be made from composites, foams, hollow air structures, inner tubes or any other variation or combination known today. This specification is not intended to limit the construction of the board body 112 to any specific description, but rather is presented here for illustrative purposes.

The board body 112 has a top rider surface 114 where the rider 152 can lay upon in a prone position. The prone position describes how the rider 152 lays upon the board with his stomach facing the top rider surface 114 and with the rider's back facing upwards. This position is common for many users of surfboards and boogie boards. It allows the rider 152 to lay upon the board and keep a low center of gravity to prevent tipping over, which is especially important with surging waves in a surf environment. The rider 152 can then grasp the front of the board to help secure his position relative to the board body 112. The front of the board may even have specially designed hand holds to allow the rider 152 to better grasp the board body 112.

Opposite the top rider surface 114 is the bottom submerged surface 116. The bottom submerged surface 116 faces downward into the water and will usually be submerged. The board body 112 may be defined having a front section half 118 and a rear section half 120. When the rider 152 lays in the prone position, the rider's legs will lay upon the rear section half 120 and the rider's upper body will lay upon the front section half 118.

The board body 112 may also be defined having a board centerline 122 along the center of the board body 112 from the front section half 118 to the rear section half 120. This board centerline 122 is generally parallel to both the top rider surface 114 and the bottom submerged surface 116. The board centerline 122 separates the left side and right side of the board body 112.

A board plane 124 may also be defined as being generally parallel to and between the top rider surface 114 and the bottom submerged surface 116. The board plane 124 will also be generally parallel to a water line when the human powered watercraft 110 is placed in a water source.

A typical rider 152 of a water board, such as a surfboard, propels forward by paddling with the arms and hands. The legs of a human are more powerful than the arms and have increased energy and endurance. Channeling the energy of the legs into propulsion is a more efficient use of the human form. When the rider 152 is in the prone position, the rider 152 can curl and extend his lower legs about the knee. This is similar to the motion one would make in a gym using various weight lifting equipment designed to work the upper leg. This motion utilizes the large muscle groups of the upper legs.

In an exemplary embodiment, the leg engagement mechanism 126 is shown. The leg engagement mechanism 126 harnesses the motion of the legs curling and extending while the rider 152 is in the prone position. The leg shaft 128 has a proximal leg shaft end 130 and a distal leg shaft end 132. The leg shaft 128 is connected to the board body 112 near the proximal leg shaft end 130 and can pivot freely about a leg shaft axis 154 allowing the rider 152 to curl and extend his legs about the knee allowing the leg shaft 128 to follow. This is accomplished by securing the lower ankle of the rider 152 to the leg shaft 128. Near the distal leg shaft end 132 are a rear ankle support 134 and a front ankle support 136. As the rider 152 curls his leg backwards, the rear of the rider's ankle pushes against the rear ankle support 134. When the rider 152 extends his leg straight, the front of the rider's ankle pushes against the front ankle support 136. The ankle supports 134 & 136 may be designed to comfortably engage the rider's legs. This may include various forms and shapes to conform to the human ankle and/or foot. This may also include using various padded or cushioned supports to help distribute the load bearing over a larger contact patch. Another embodiment is for the rider 52 to place his feet within specially designed shoes or flipper-like attachments that are connected to the leg shaft 128. As can be seen from this teaching, a multitude of designs can be configured to efficiently and comfortably convert the motion of the rider's legs while in a prone position to mechanical movement. This specification is not intended to limit the design to any one of the exemplary embodiments.

Figure 4:
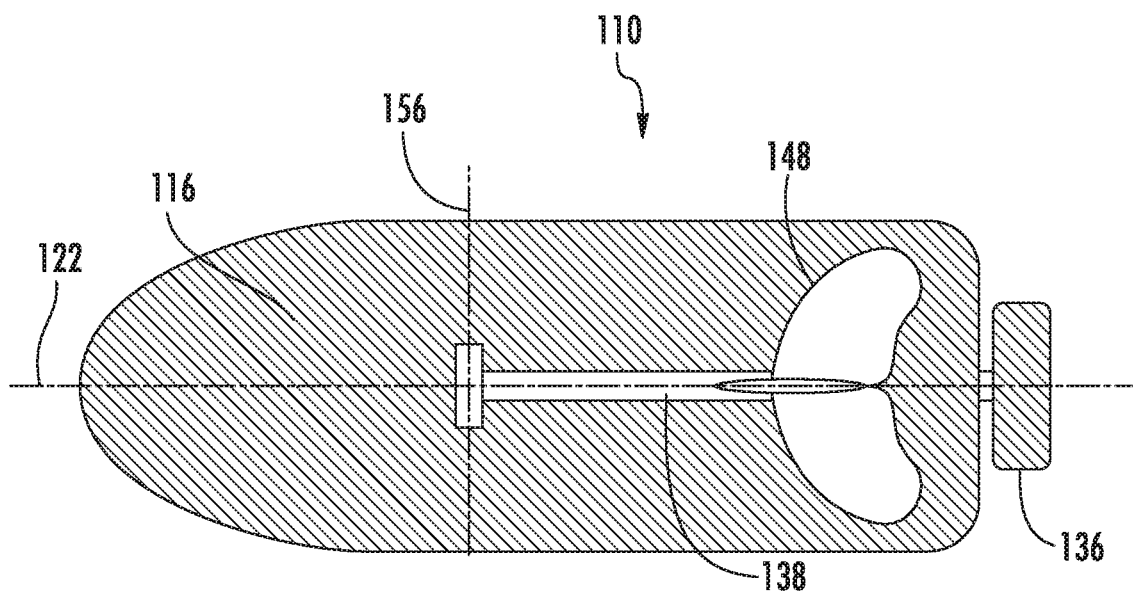
FIG. 4 is a bottom view of the structure of FIG. 1.
Figure 5:
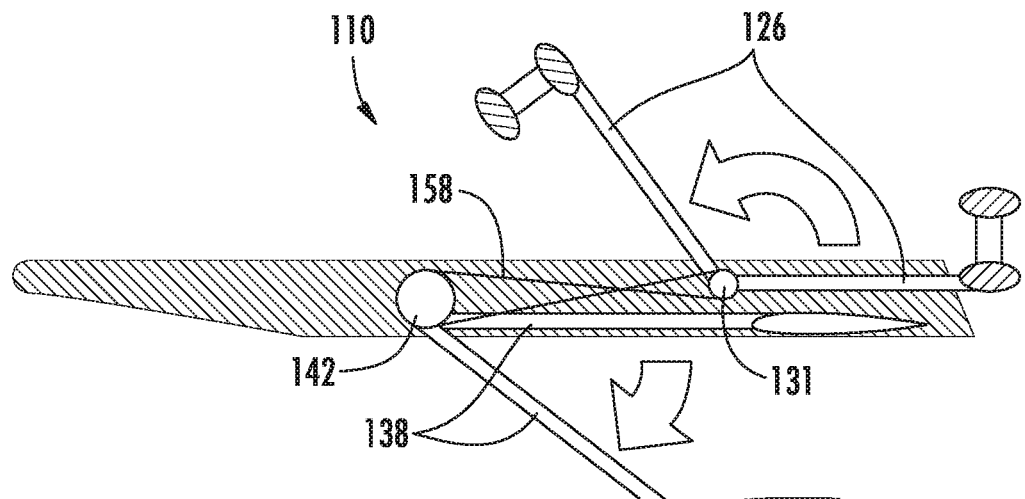
FIG. 5 is a side view of the structure of FIG. 1 now in motion.
Figure 6:
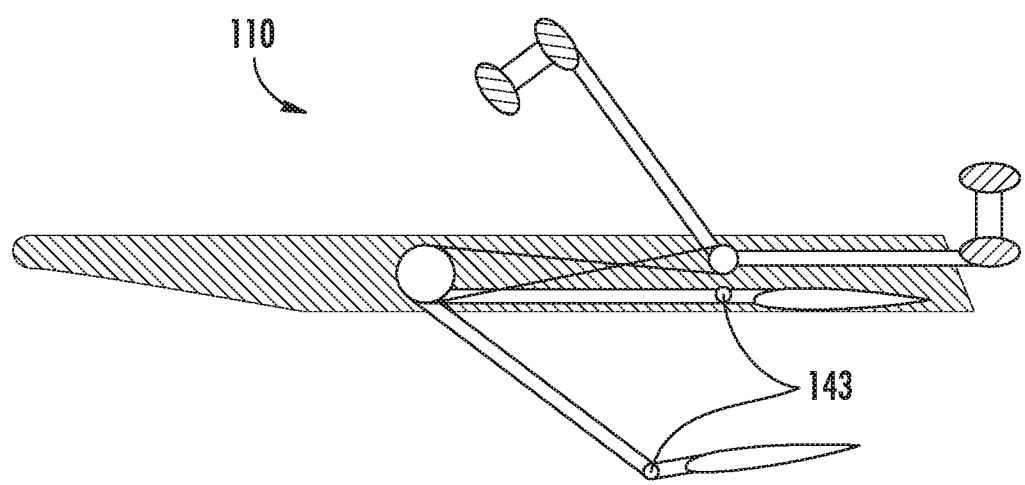
FIG. 6 is a side view of the structure of FIG. 1 now in motion and showing additional linkages.

In an exemplary embodiment and submerged below the water line is the fin propulsion mechanism 138. The fin propulsion mechanism 138 moves fin 148 through the water in a manner similar to various marine creatures, such as a dolphin, thereby creating a forward thrust in the water. A fin shaft 140 has a proximal fin shaft end 144 and a distal fin shaft end 146. The proximal fin shaft end 144 is pivotally attached to the board body 112 and can pivot freely about a fin shaft axis 156. The fin 148 is attached to the distal fin shaft end 146. The fin shaft 140 is able to pivot in an arcuate path below the waterline and allows the fin 148 to move in a similar manner to a propulsion stroke of a dolphin or similar marine creature. The fin 148 can be made of a flexible material, such as a rubber, plastic, or a composite structure or combination thereof. Having flexibility may channel forward thrust in a more efficient manner as the fin 148 interacts with the surrounding water. As shown in FIG. 6, the fin 148 may also be connected to the distal fin shaft end 146 in a pivotable fin linkage 143, to help get a better approach angle with respect to a propulsion stroke. The fin 148 may also be connected to the distal fin shaft end 146 with a multitude of pivotable linkages, to help get a better approach angle with respect to a propulsion stroke. Using one or many pivotable linkages helps to recreate the motion of the tail of a dolphin or similar marine creature. The fin 148 may also be made in a multitude of shapes and designs. Current fin propulsion technology may be applied to increase the efficiency of the fin design. In FIG. 4, the fin 148 can be seen as represented similar to the tail of a dolphin. As can be seen from this teaching, a multitude of fin designs can be configured to efficiently create propulsion from the fin 148. This specification is not intended to limit the design to any one of the exemplary embodiments.

In an exemplary embodiment, a mechanical coupling 150 is shown which channels energy from the leg engagement mechanism 126 to the fin propulsion mechanism 138. The mechanical coupling 150 converts the rotational movement of the rider's legs to the movement of the fin 148. In the exemplary embodiment of FIG. 5, a belt 158 is shown engaging a leg shaft sprocket 131 and fin shaft sprocket 142. Belt 158 may be made from a multitude of materials, including but not limited to plastics, rubbers, synthetic materials, composites, roller chain link, chain link or any other combination thereof. Belt 158 may be configured to have engaging teeth on its underside to better engage the sprockets 131 & 142. The sprockets may be similarly designed to engage the teeth of belt 158, and can be formed to accept roller chain, chain, v-belt, flat belt or any other combination or variation known. Furthermore, belt 158 may be desired to run in a figure eight pattern as shown in the figures. This allows the human powered watercraft 10 to be in a stored position with the rider 152 at rest. The stored position is where the leg shaft 128 and fin shaft 140 are parallel to the board plane 124, resulting in slim board profile. This allows the rider 152 to use the board as a normal surfboard or boogie board when desired.

In another exemplary embodiment, it may be desirable to build in a preset resistance or bias for the leg engagement mechanism 126 and the fin propulsion mechanism 138 to remain in the stored position when the rider 152 does not have his legs within the ankle supports 134 & 136. This would allow the rider 152 to use the human powered watercraft 110 as a surf board or boogie board without having to worry about the fin propulsion mechanism 138 lowering into the water and getting caught or snagged on various obstacles. This preset resistance or bias can be accomplished in a multitude of ways, including but not limited to springs, tensioners, rubber bands, pulleys, magnets or various other devises or designs. As can be seen from this teaching, a multitude of designs of a mechanical coupling 150 can be configured. This specification is not intended to limit the design to any one of the exemplary embodiments.

Figure 7:
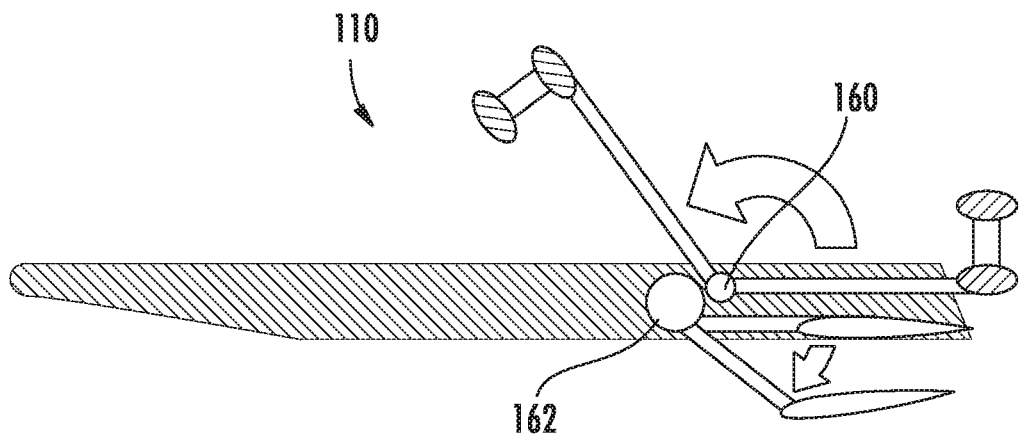
FIG. 7 is a side view of another exemplary dolphin board embodying the present invention.

In another embodiment, the mechanical coupling 150 may be two gears directly engaging each other as show in FIG. 7. Leg shaft gear 160 directly engages and drives the fin shaft gear 162. This would eliminate the need for a belt 158. This configuration is already optimized to create a stowed position as the leg shaft gear 160 rotates in an opposite direction as the fin shaft gear 162. Other variations of mechanical coupling 150 may be created involving pulleys, belts, sprockets, chains, levers or the like or combinations thereof. As can be seen from this teaching, a multitude of designs of a mechanical coupling 150 can be configured. This specification is not intended to limit the design to any one of the exemplary embodiments.

Figure 8:
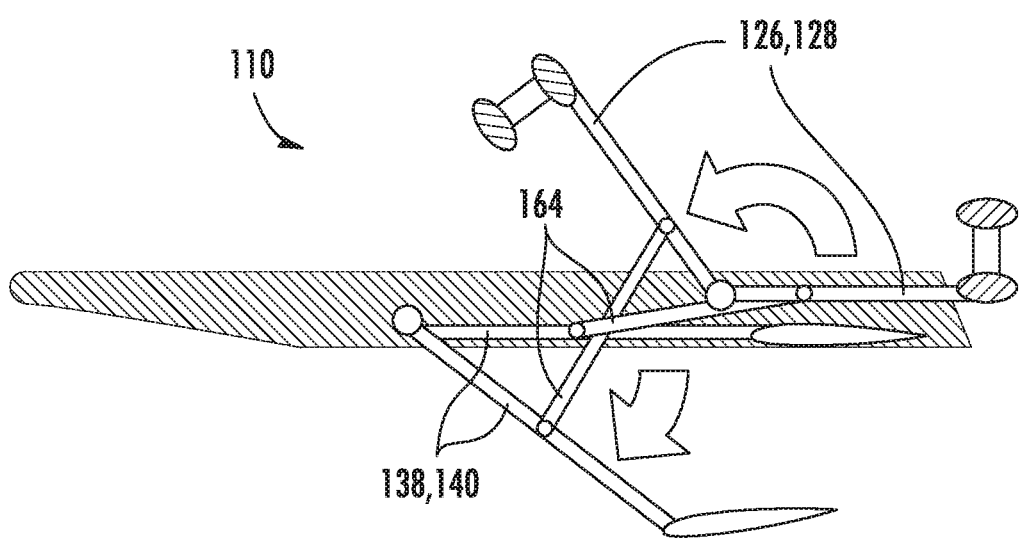
FIG. 8 is a side view of another exemplary dolphin board embodying the present invention.

In another embodiment, the mechanical coupling 150 may be configured to create a reduced ratio between the leg engagement mechanism 126 and the fin propulsion mechanism 138, as shown in FIGS. 7 and 8. The rider 152 is able to curl and extend his lower legs about a 135 degree arc of rotation, whereas the fin shaft 140 moves about 30 to 45 degrees in an arc of rotation. Moving the fin shaft 140 beyond this angle would not result in additional thrust, but would hinder forward thrust. Therefore, a mechanical reduction ratio may be desired to allow the rider 152 to move his legs in a full range of motion to better channel energy of the human form into propulsion. This accordingly corresponds to the figures which depict the leg shaft sprocket 131 being smaller in diameter than the fin shaft sprocket 142, and also depicting how the leg shaft gear 160 is smaller in diameter than the fin shaft gear 162. This thrust ratio can be optimized and may range between a 1:1 ratio to about 4:1 ratio. A ratio of 3:1 may be desired, as this corresponds to 45 degrees of rotation of the fin shaft 140 with about 135 degrees of rotation of the leg shaft 128. As can be seen from this teaching, a multitude of designs of a mechanical coupling 150 can be configured. This specification is not intended to limit the design to any one of the exemplary embodiments.

In another embodiment of a mechanical coupling, a connection link 164 is shown in FIG. 8. By properly pivotally attaching and sizing the connection link 164 along the leg shaft 128 and fin shaft 140, a mechanical reduction is obtainable. As leg shaft 128 rotates when rider 152 curls his legs, it forces the connection link 164 closer to the fin shaft axis 156, thereby forcing the fin shaft 140 downward. This exemplary embodiment would simplify the mechanical coupling 150 resulting in a simpler, less complicated design. By varying the length of the connection link 164 and by rotatably attaching it along different spacings with respect to the leg shaft 128 and fin shaft 140, different reduction ratios are possible. As can be seen from this teaching, a multitude of designs of a mechanical coupling 150 can be configured with a connection link 164. This specification is not intended to limit the design to any one of the exemplary embodiments.

Figure 9:
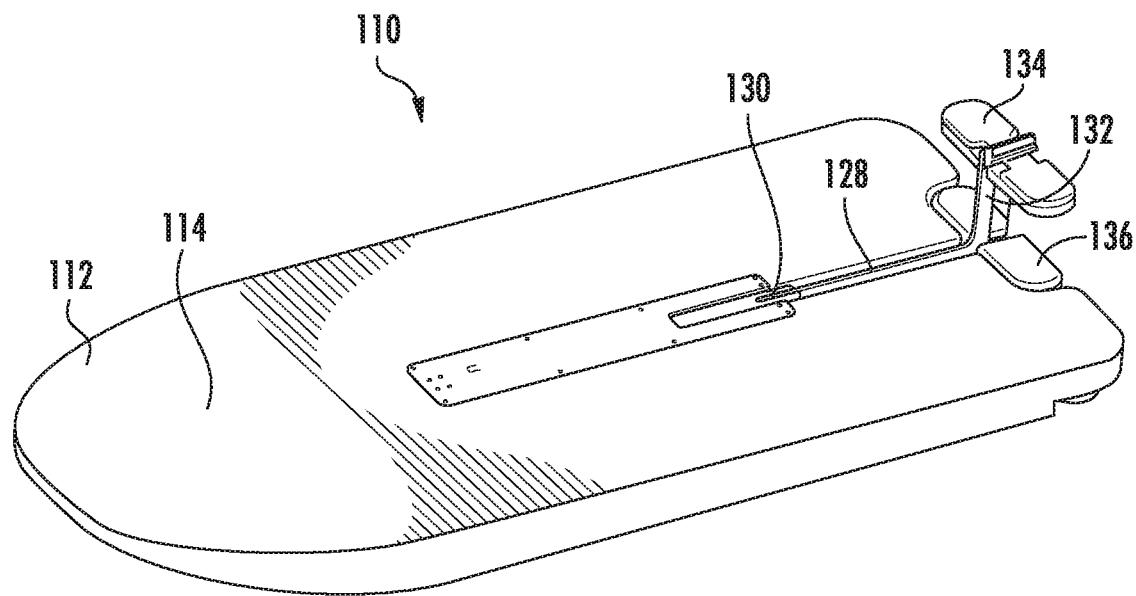
FIG. 9 is a top perspective view of another exemplary dolphin board embodying the present invention.
Figure 10:
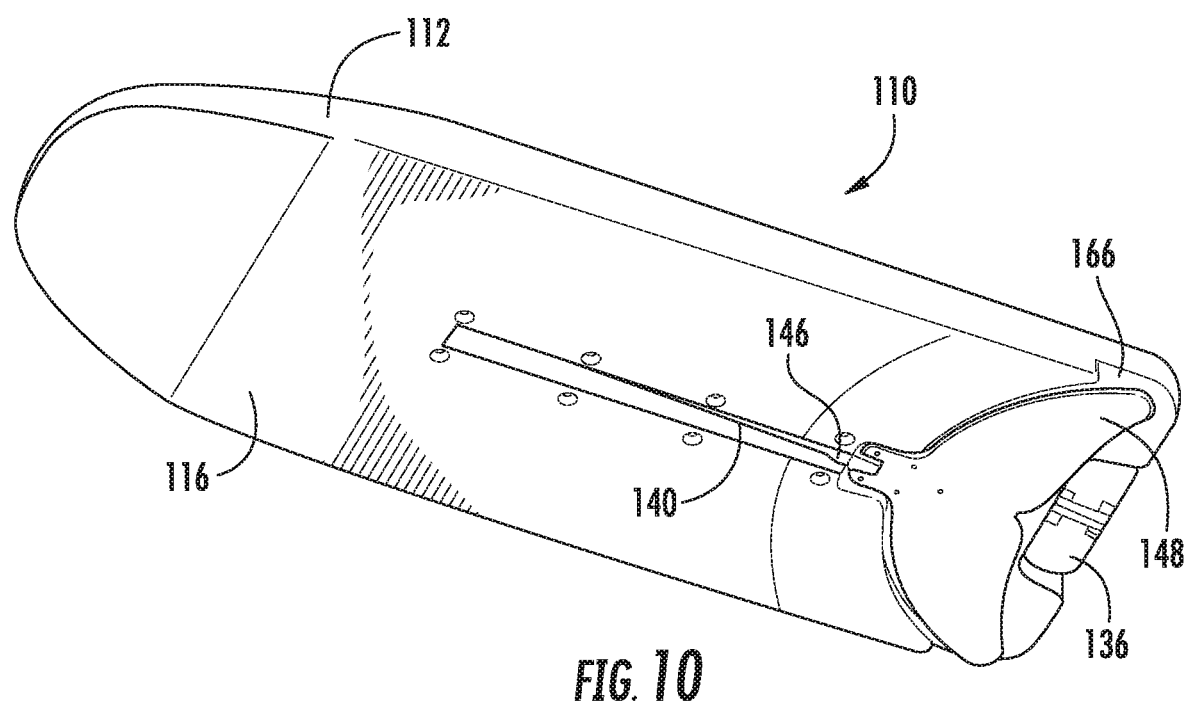
FIG. 10 is a bottom perspective view of the structure of FIG. 9.
Figure 11:
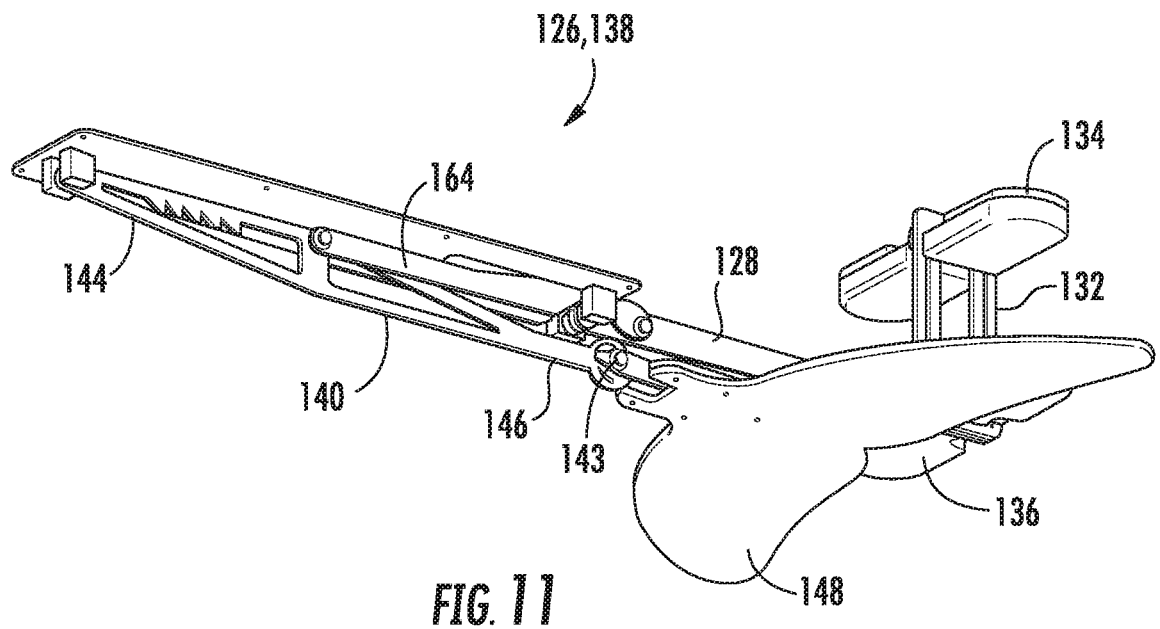
FIG. 11 is a bottom perspective view of the structure of FIG. 9 and similar in view to FIG. 10, now showing the board body removed and in the stored position.
Figure 12:
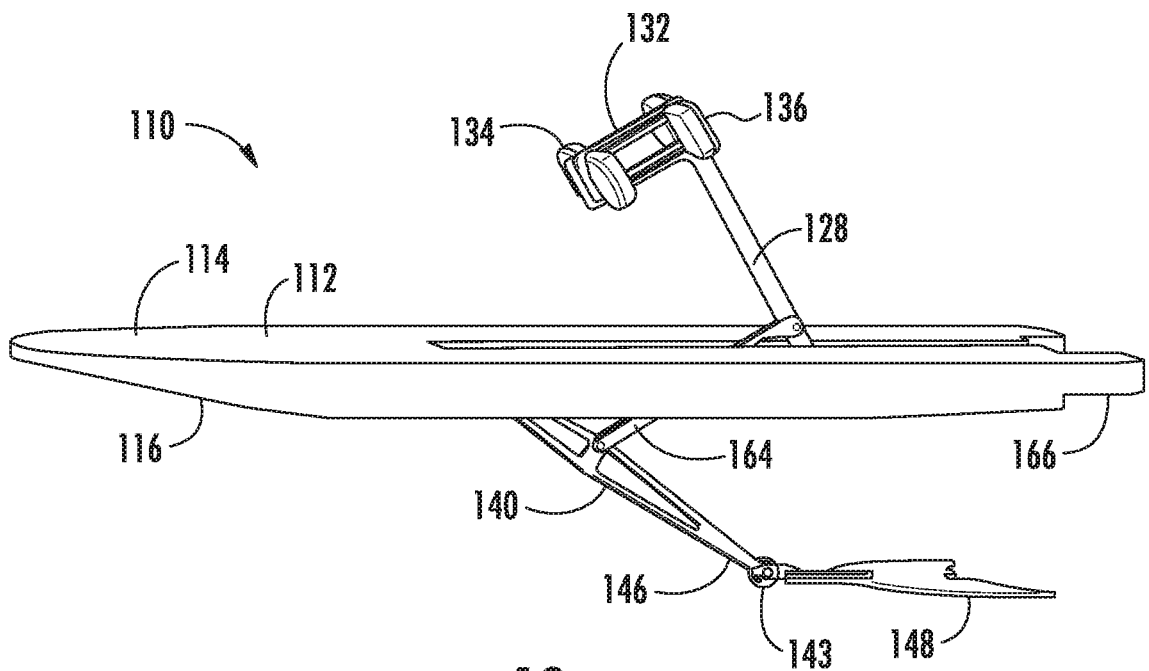
FIG. 12 is a side perspective view of the structure of FIG. 9 now showing the deployed position.

FIGS. 9-12 are of another exemplary embodiment of the present invention. FIGS. 9 and 10 are perspective views of a human powered watercraft 100 with the mechanism in the stowed position. FIG. 11 is of the mechanism itself without the board body 112. FIG. 12 is of the mechanism attached the board body 112 and in the deployed position. The board body 112 has a fin recess 166 such that the fin 148 can fit within the confines of the board body 112 and not protrude outwardly when in the stored position.

The foregoing description of the exemplary embodiments have been presented for the purposes of illustration and description. It is not intended to be exhaustive or to limit the invention to the precise form disclosed. Many modifications and variations are possible in light of the above teaching that others can, by applying current knowledge, readily modify and/or adapt for various applications such specific embodiments without undue experimentation and without departing from the generic concept. Therefore, such adaptations and modifications should and are intended to be comprehended within the meaning and range of equivalents of the disclosed embodiments. It is to be understood that the phraseology or terminology employed herein is for the purpose of description and not of limitation. It is intended that the scope of the invention not be limited by this detailed description, but rather by the claims appended hereto and all equivalents thereto. Thus the expression "means to . . . " and "means for . . . ", or any method related language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

Invention 2: Waller Coasters

Toy cars, trains and other vehicles have been a staple in the toy industry for decades. Toy tracks have also been made and sold where a user can play with a toy car on a preformed track. Sometimes these tracks are comprised of interchangeable parts such that a user can design a custom track. Roller coasters are typically amusement park rides that one must travel to for a ride. Young children are typically too small and young to ride on such amusement park rides, but these rides are still captivating and interesting to them. Accordingly, there exists a need to combine toy vehicles with roller coasters to result in a new toy and play pattern.

The present invention relates in general to roller coasters, and in particular to a toy roller coaster which is mounted upon a wall comprising a multitude of interchangeable tracks. This invention is generally referred to herein as "Waller Coasters." In the following description of the exemplary embodiments, reference is made to the accompanying drawings that form a part hereof, and in which is shown merely by way of illustration. It is to be understood that other embodiments may be used and structural changes may be made without departing from the scope of the present invention.

Figure 13:
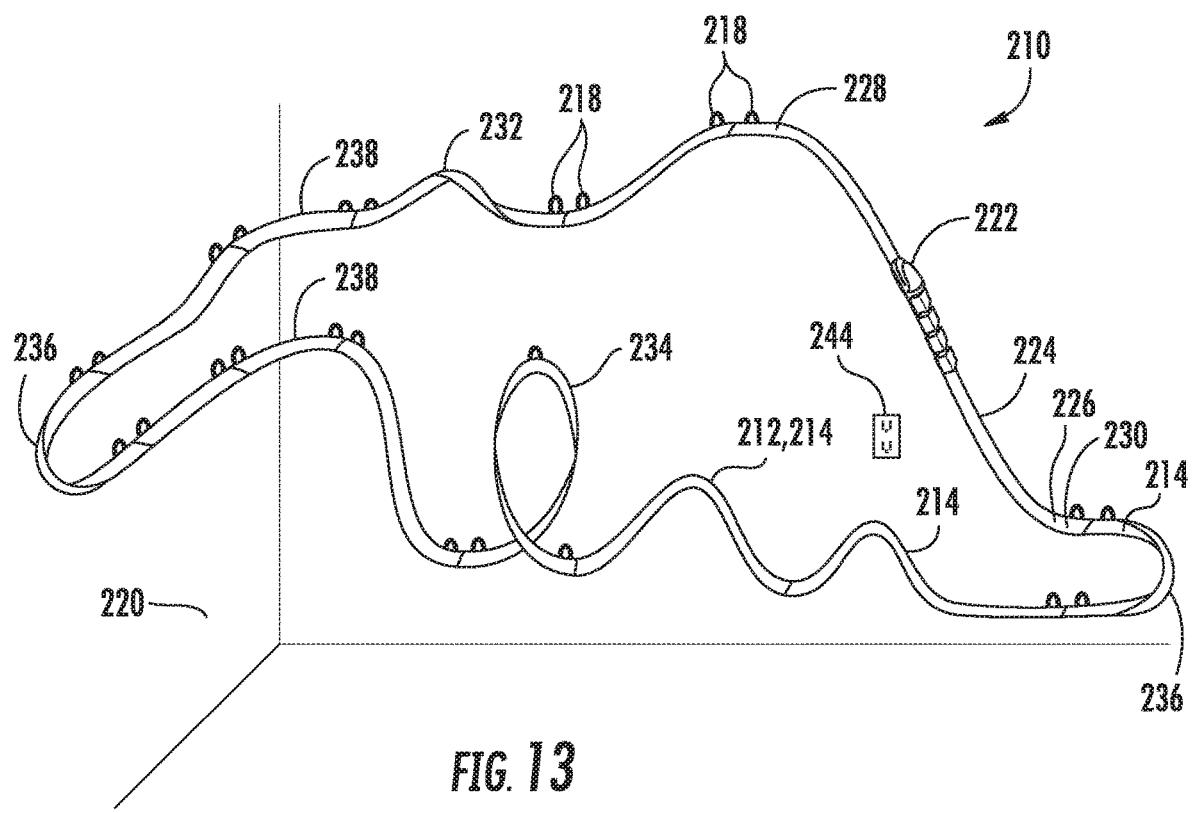
FIG. 13 is a perspective view of an exemplary waller coaster embodying the present invention.
Figure 14:
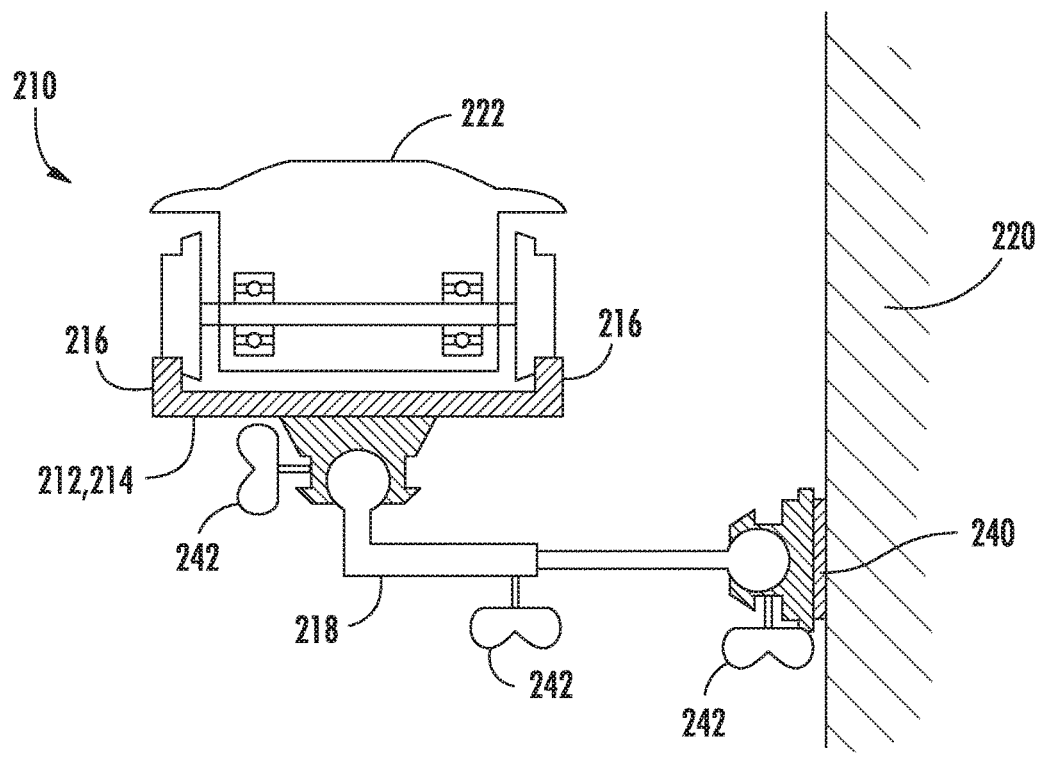
FIG. 14 is a sectional view of the structure of FIG. 13.

As shown in FIGS. 13-14, a wall-mounted toy roller coaster 210 is disclosed. A continuous track 212 consists of a plurality of interchangeable track members 214 that the user can combine to form a custom track. Each track member 214 is connectable to an adjacent track member 214. Each track member 214 includes spaced support rails 216 extending outwardly of and underlying the track members 214. The track members 214 may be rigid, or may be flexible and positionable. For instance, the track members 214 may be made of a flexible plastic or rubber with a metallic brace or internal support that holds the shape it is bent to.

A wall mounting fixture 218 is attached to at least one of the plurality of track members 214. Alternatively, each of the plurality of track members 214 may have a wall mounting fixture 218 attached. The wall-mounting fixtures 218 allow each track member 214 to be mounted upon a wall 220 and to be positionable.

A vehicle 222 is configured to roll upon the track members 214 engaging the spaced support rails 216. The vehicle 222 may be a single vehicle 222 or a plurality of vehicles 222 to form a roller-coaster like vehicle. Each of the plurality of vehicles 222 is movably connected to an adjacent vehicle 222 such that each vehicle 222 and turn and rotate upon the spaced support rails 216. In these embodiments the vehicle 222 is merely placed upon the track members 214 and spaced support rails 216. In an alternative embodiment not shown, the vehicle 222 may be configured to actively capture a support rail such that the vehicle 222 cannot come apart from the rail. This type of a design is similar to modern roller-coasters that are rolling upon long tracks that are captured by rollers from multiple sides.

At least one of the plurality of track members 214 comprises a lifting mechanism 224 disposed between a lower section 226 and a higher section 228. The lifting mechanism 224 engages the vehicle 222 at the lower section 226 and moves the vehicle 222 to the higher section 228 where it is released. The lifting mechanism 224 is essentially the first part of a typical roller coaster ride where the roller coaster is pulled to a higher elevation so that it may then roll upon and throughout the track. The lifting mechanism 224 may be battery operated or plugged into an electrical outlet 244. A sensor 230 may be integrated into the lifting mechanism 224 such that it can sense when a vehicle 222 is at the lower section 226 and then move it to the higher section 228 and release it. In this way, the wall-mounted toy roller coaster would continuously operate. As is apparent to one skilled in the art, there are a multitude of designs that may encompass the lifting mechanism 224. For instance, the lifting mechanism may be a chain, belt, string, lever or other suitable mechanical means that moves the vehicle 222 from the lower section 226 to the higher section 228.

The plurality of track members 214 can comprise a wide variety of shapes and configurations. For example, the track members 214 can comprise a twist/corkscrew 232, a loop 234, a 180 degree turn 236, a 90 degree turn 238, and other various bends, turns, drop, lifts or shapes. All of the track members 214 are interchangeably connectable, so there is not a limit to the size or complexity of the continuous track 212. For example, multiple lifting mechanisms 224 may be utilized to create an extra long continuous track 212.

The wall-mounting fixture 218 can attach to the wall 220 in a multitude of ways through nails, screws, fasteners, brackets or the like, but is preferably attached to the wall through removably adhesive strips 240. These adhesive strips 240 are commonly found in hardware stores for hanging pictures and other various objects without the need to puncture the wall or create holes. The adhesive strips 240 have a tab that can be pulled which releases the adhesive from the surface it is placed upon. The adhesive 240 may be then reused to reposition the track members 214 to a new location.

It may be desirous to create a wall-mounting fixture 218 that is positionable such that a user can fine tune their track for optimum performance. Accordingly, a series of fasteners, screws or thumb screws 242 can relax or tighten various pivot points or lengthening points to create the right curvature for each track member 214.

In addition to the physical toy, software may be made which complements the physical product. For instance, a user could log onto a companies website and pre-build a series of custom tracks and then run tests to determine whether the track will work or not. The software would have similar preset parts that match the real product available for purchase. Then the user could build a custom track and test it out before actually attempting to build the real thing on their wall. The software would also give suggestions and allow the user to try out parts they currently did not already own. The software would be customizable such that a user can create the wall structure they have available at their residence and then build a custom track for that wall. The software may be accessible over the internet, purchased separately or purchased along with the physical product.

In summary, a wall-mountable toy roller coaster, comprises: a continuous track mountable upon a wall, the track comprising a plurality of track members wherein each track member is connectable to an adjacent track member and includes spaced support rails extending outwardly of and underlying the track members; a wall mounting fixture attached to at least one of the plurality of track members; and a vehicle configured to roll upon the track engaging the spaced support rails; wherein at least one of the plurality of track members comprises a lifting mechanism disposed between a lower section and a higher section, wherein the lifting mechanism engages the vehicle at the lower section and moves the vehicle to the higher section where it is released. The wall mounting fixture may comprise a removable adhesive. The wall mounting fixture may comprise a plurality of adjustment fixtures. At least one of the plurality of track members may comprise a flexibly positionable track member. The vehicle may comprise a plurality of vehicles. A coupling mechanism may be between each of the plurality of vehicles. At least one of the plurality of track members may comprise a corkscrew, a loop, a 180 degree turn, a 90 degree turn or even a jump. The lifting mechanism may comprise a vehicle proximity sensor for automatic activation. The lifting mechanism may comprise a battery or an electrical cord. A software program may relate to the continuous track, the software comprising the plurality of track members allowing a user to construct a preliminary track in the computer, test the efficiency of the design and then physically build the continuous track on the wall.

The foregoing description of the exemplary embodiments have been presented for the purposes of illustration and description. It is not intended to be exhaustive or to limit the invention to the precise form disclosed. Many modifications and variations are possible in light of the above teaching that others can, by applying current knowledge, readily modify and/or adapt for various applications such specific embodiments without undue experimentation and without departing from the generic concept. Therefore, such adaptations and modifications should and are intended to be comprehended within the meaning and range of equivalents of the disclosed embodiments. It is to be understood that the phraseology or terminology employed herein is for the purpose of description and not of limitation. It is intended that the scope of the invention not be limited by this detailed description, but rather by the claims appended hereto and all equivalents thereto.

Invention 3: Wall Mounted Doll House

Young girls enjoy playing with large doll houses. However, large dollhouses are usually very expensive due the large amount of material they are comprised of and also large doll houses take up a considerable amount of floor space. Accordingly, there is a need to allow young girls the same enjoyment of playing with large dollhouses without the excess size and cost.

The present invention relates in general to doll houses, and in particular to a wall-mountable doll house. This invention is generally referred to herein as the "Wall-Mounted Doll House." In the following description of the exemplary embodiments, reference is made to the accompanying drawings that form a part hereof, and in which is shown merely by way of illustration. It is to be understood that other embodiments may be used and structural changes may be made without departing from the scope of the present invention.

Figure 15:
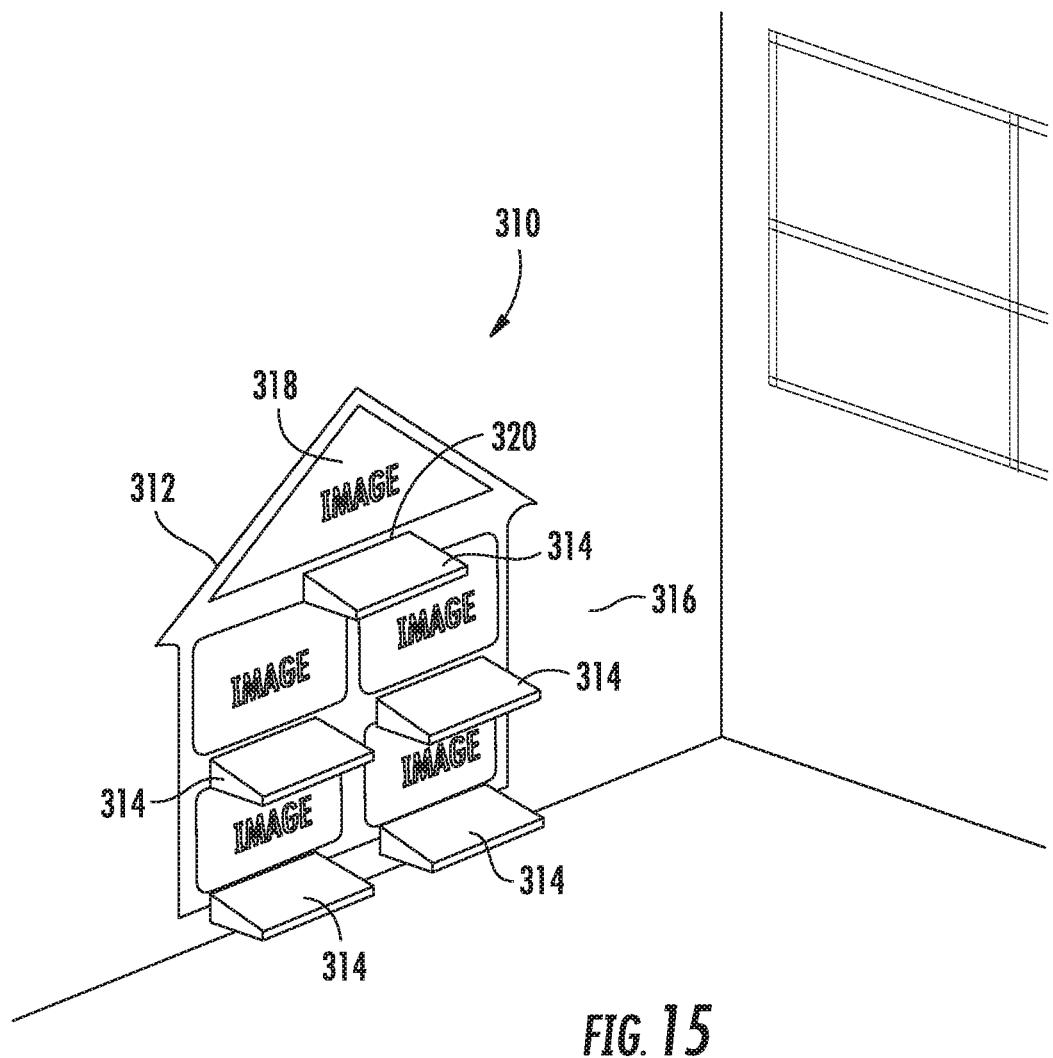
FIG. 15 is a perspective view of an exemplary wall mounted doll house of the present invention.
Figure 16:
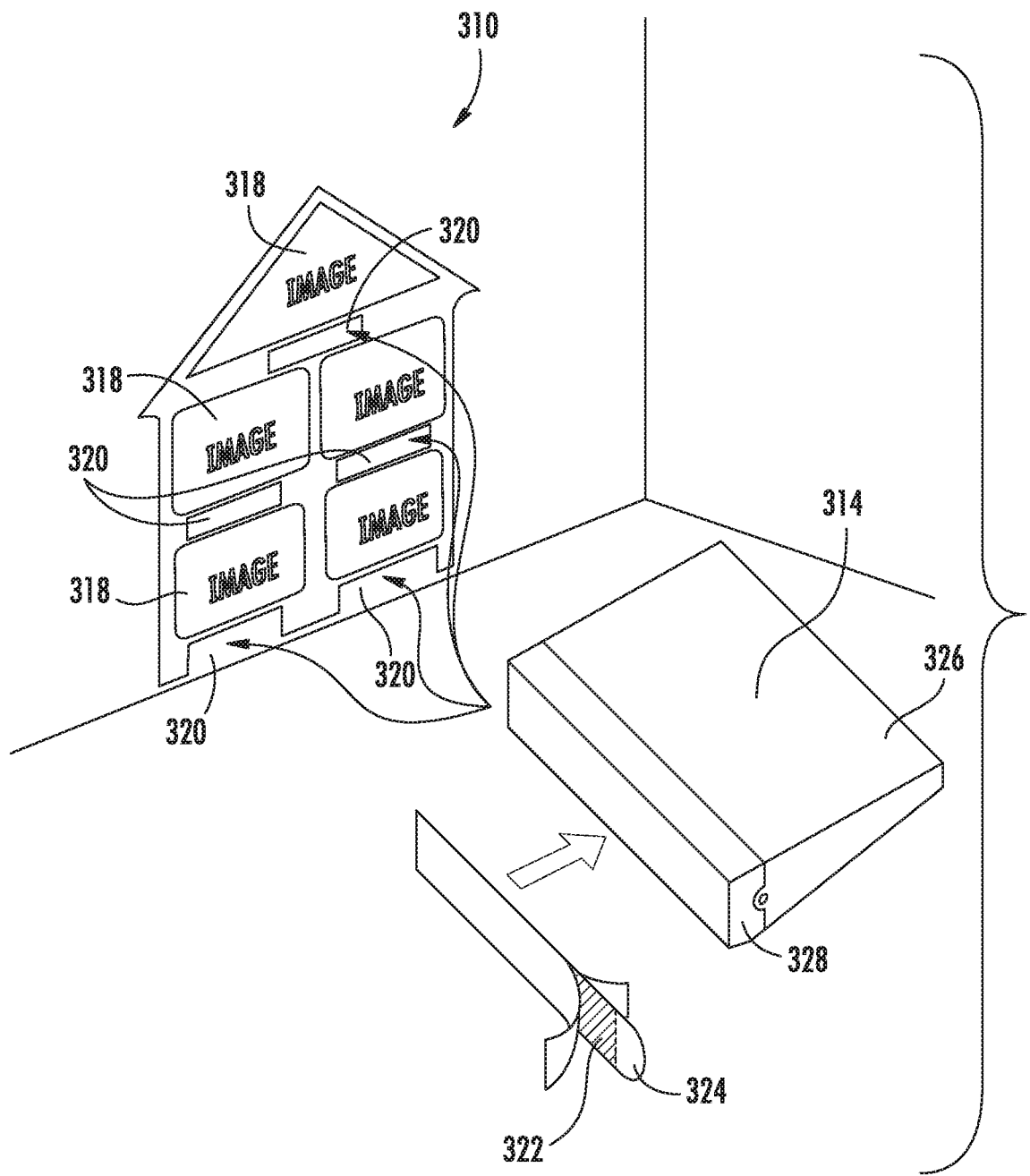
FIG. 16 is a perspective view similar to FIG. 15 now showing how the shelves are attached within apertures formed in the template.
Figure 17:
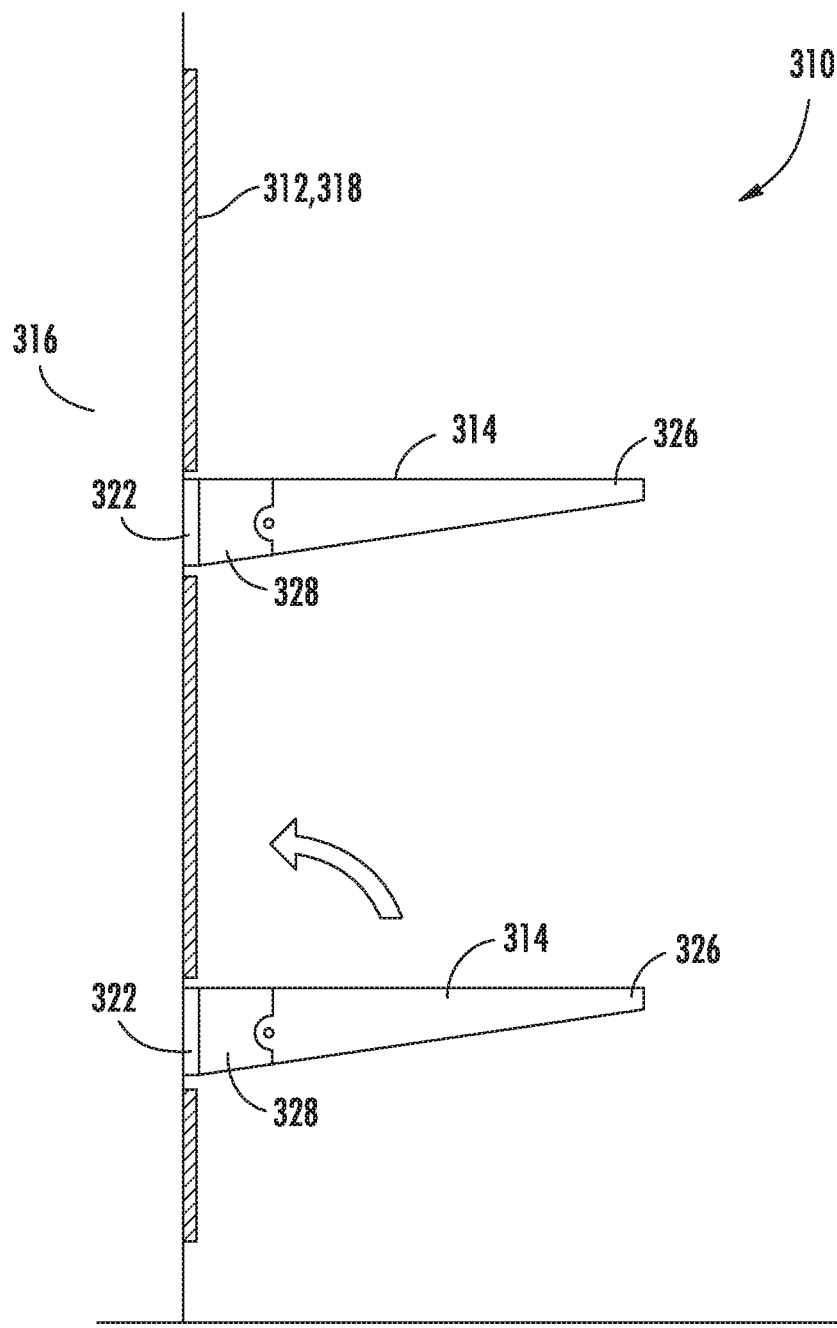
FIG. 17 is a side sectional view of the structure of FIG. 15.

As shown in FIGS. 15-17, a wall-mountable doll house 310 comprises a template 312 and a shelf 314. The template 312 is removably attachable to a wall 316. The template 312 may include an adhesive backing, a vacuum backing or stick to the wall 316 through static electricity. The template 312 may depicting an image 318 of an inside view of a multilevel home.

An aperture 320 is formed in the template 312. The aperture 320 is sized to match the shelf 314. The shelf 314 fits within the aperture 320 and is removably mountable to the wall 316. The shelf 314 may be attached to the wall 315 through fasteners, hooks, or other similar means but it is preferred to use a removable adhesive 322. A tab 324 on the adhesive allows one to remove the adhesive 322 from the wall 316. When the tab 324 is pulled, it releases the grip the adhesive 322 has along the wall. The adhesive 322 may then be reused for a new positioning.

In practice, the template 312 would be placed along the wall 316. Then the adhesive is attached to the shelf 314. The shelf 314 is then placed in the aperture 320 to the wall 316. The shelf 314 is matched to represent the flooring of a room, which serves as a floor to the image 318 which depicts the inside of the home. As can be seen by one skilled in the art, the shelf 314 can be a plurality of shelves 314 and the aperture 320 can be a plurality of apertures 320.

Once a young girl wants to play with a new home, the template 312 can be removed and exchanged for a different template 312 depicting a different image 318 of an inside of a home. The shelf 314 or plurality of shelves 314 can remain as the templates 312 are interchangeable.

The present invention is significantly cheaper than purchasing a full-sized comparable doll house. Furthermore, the present invention takes up less space. As can be seen by one skilled in the art, a plurality of interchangeable templates 312 with varying images 318 are possible. The size and complexity of the present invention can vary from single story, two-story or to multi-story homes and buildings. Any image 318 can be paired with a shelf 314 that creates a floor. For instance an image of a skyscraper can be paired with a plurality of shelves simulating the different floors of the building. Furthermore, a background image of a forest and a tree house can be paired with shelves to simulate the flooring of the tree house. As can be seen by one skilled in the art there exists a variety of images and shelves that are achievable, and this disclosure is not limited to the precise forms disclosed herein.

In an exemplary embodiment, the shelf 314 may also include a pivotable floor section 326 that pivots in relation to the mounting section 328. This pivoting feature may be handy to allow one to fold the invention up during non-play times such that the present invention takes up less space.

In summary, a wall-mountable doll house comprises: a template removably attachable to a wall, the template depicting an image of an inside view of a multilevel home; an aperture formed in the template; and a shelf removably attachable to the wall and disposed within the aperture. A second template of similar size and shape of the template may now depict a second image of an inside view of a second multilevel home, wherein the template and second template are interchangeable. The shelf may comprise a floor section pivotable in relation to a mounting section.

The foregoing description of the exemplary embodiments have been presented for the purposes of illustration and description. It is not intended to be exhaustive or to limit the invention to the precise form disclosed. Many modifications and variations are possible in light of the above teaching that others can, by applying current knowledge, readily modify and/or adapt for various applications such specific embodiments without undue experimentation and without departing from the generic concept. Therefore, such adaptations and modifications should and are intended to be comprehended within the meaning and range of equivalents of the disclosed embodiments. It is to be understood that the phraseology or terminology employed herein is for the purpose of description and not of limitation. It is intended that the scope of the invention not be limited by this detailed description, but rather by the claims appended hereto and all equivalents thereto.

Invention 4: Toy Flying Bullet

Foam bullets/darts shot from toy guns are a huge business for toy companies. Kids love to shoot these foam bullets at each other or various objects. The foam bullets are so light and soft that they do not hurt when they hit an object. However, these foam bullets do not travel very far. These foam bullets typically travel about 30 feet. Accordingly, there is a need for a toy bullet and gun design that allows the bullet to fly significantly farther.

The present invention relates in general to toy guns, and in particular to a toy gun that shoots a new bullet which is cylindrically hollow and has a center of gravity behind its physical center. This invention is generally referred to herein as the "Flying Bullet." In the following description of the exemplary embodiments, reference is made to the accompanying drawings that form a part hereof, and in which is shown merely by way of illustration. It is to be understood that other embodiments may be used and structural changes may be made without departing from the scope of the present invention.

Figure 18:
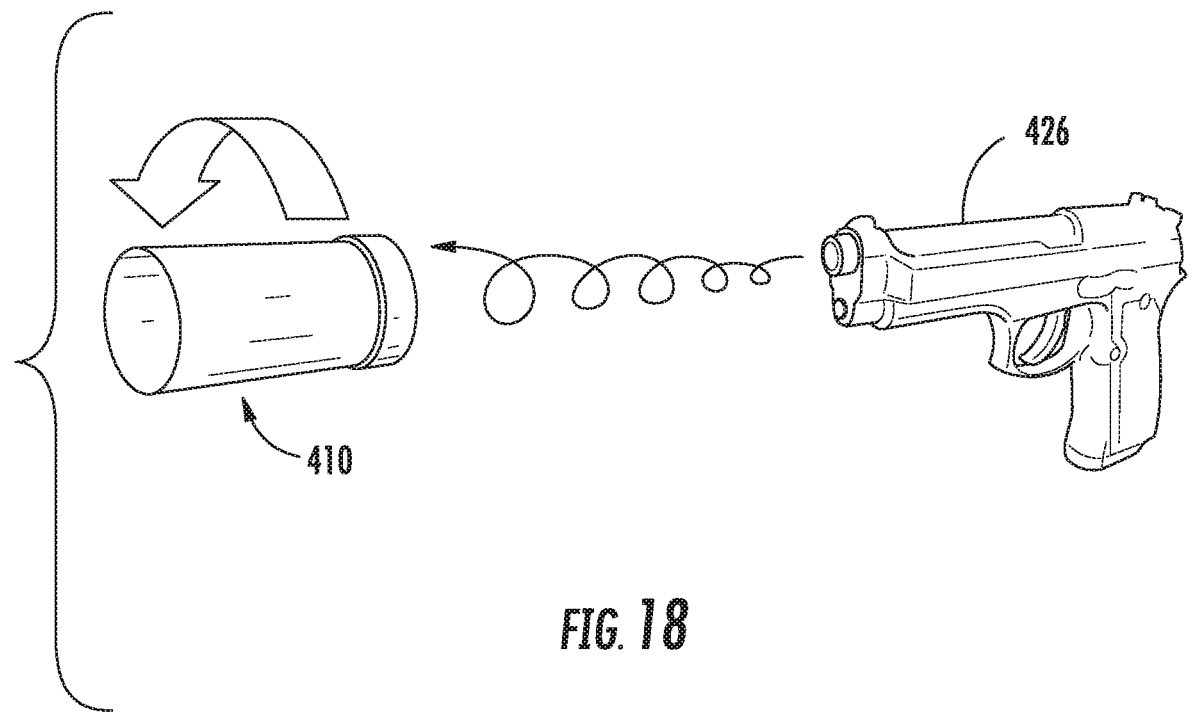
FIG. 18 is an exemplary toy flying bullet embodying the present invention.
Figure 19:
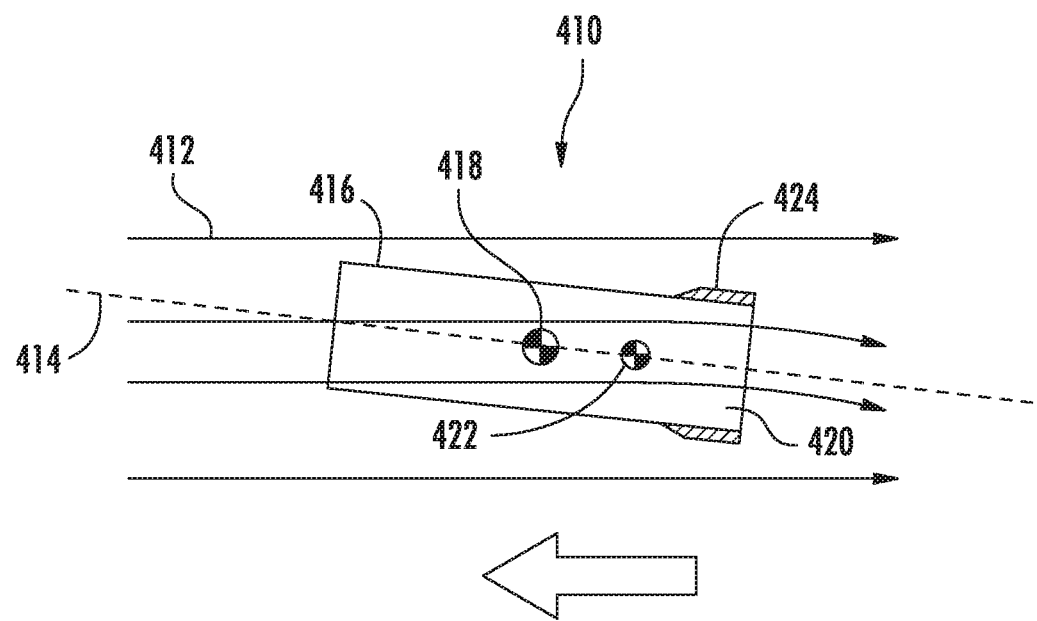
FIG. 19 is a side sectional view of the bullet structure of FIG. 18 now shown flying through an air stream.
Figure 20:
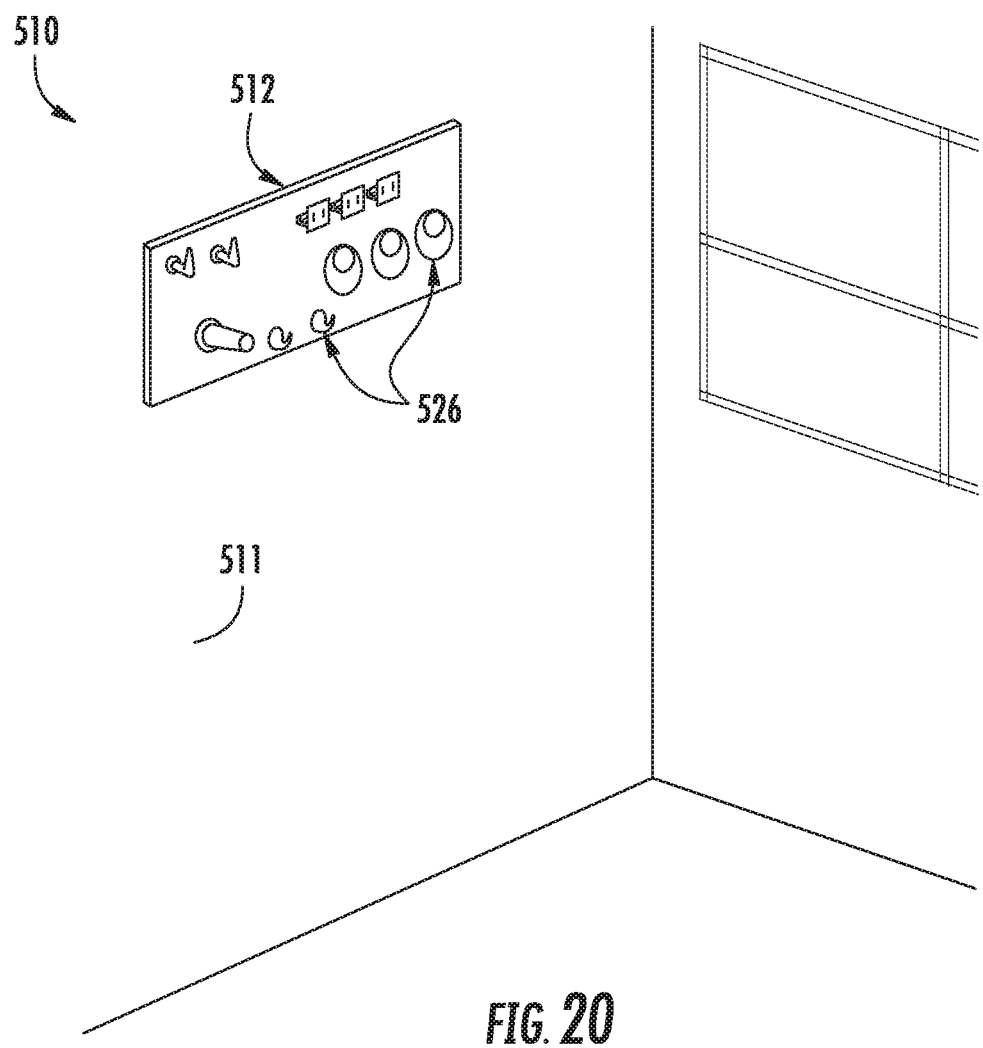
FIG. 20 is a perspective view of an exemplary jewelry display embodying the present invention.
Figure 21:
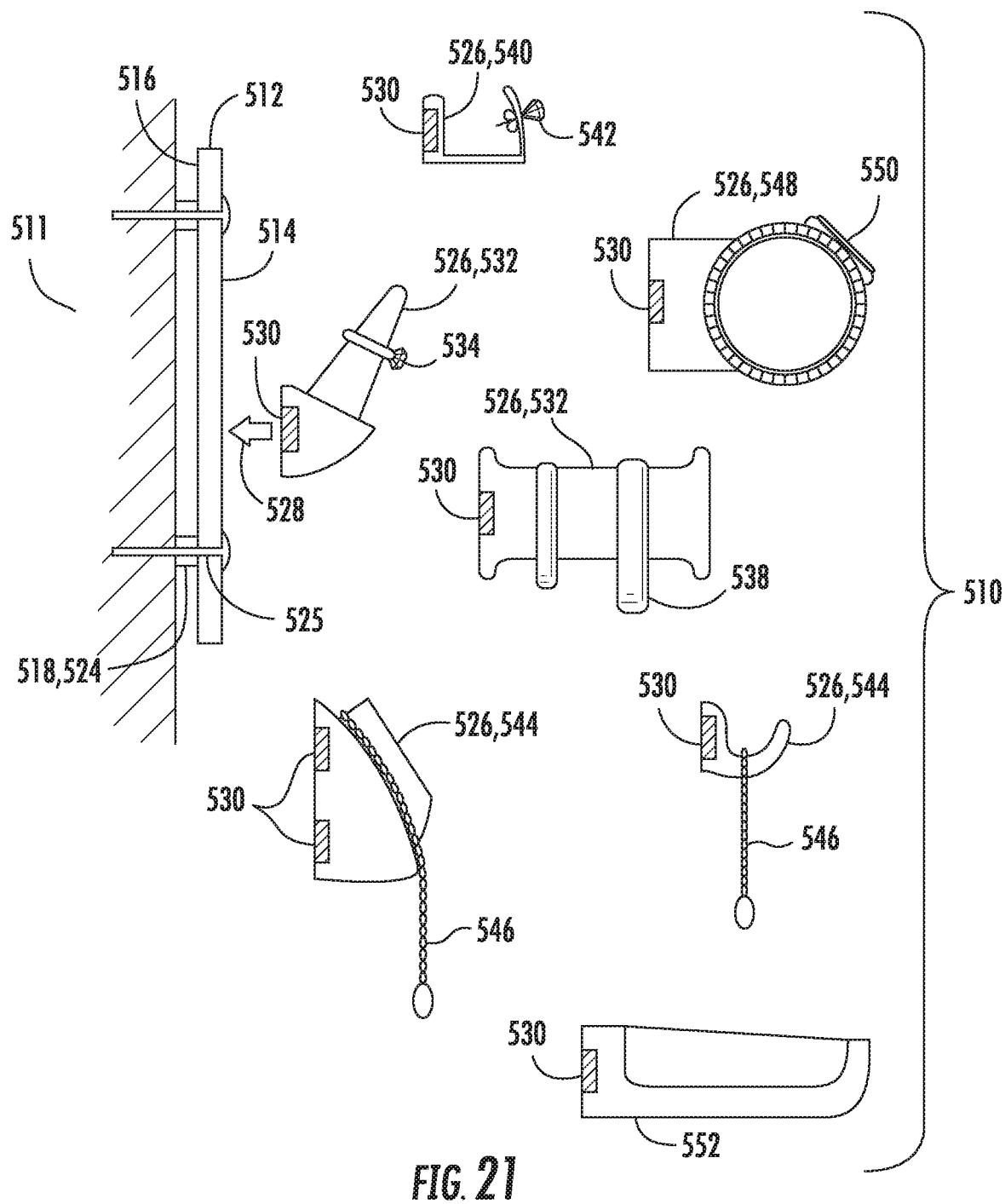
FIG. 21 is a side sectional view of the structure of FIG. 20 showing the plurality of jewelry fixtures.
Figure 22:
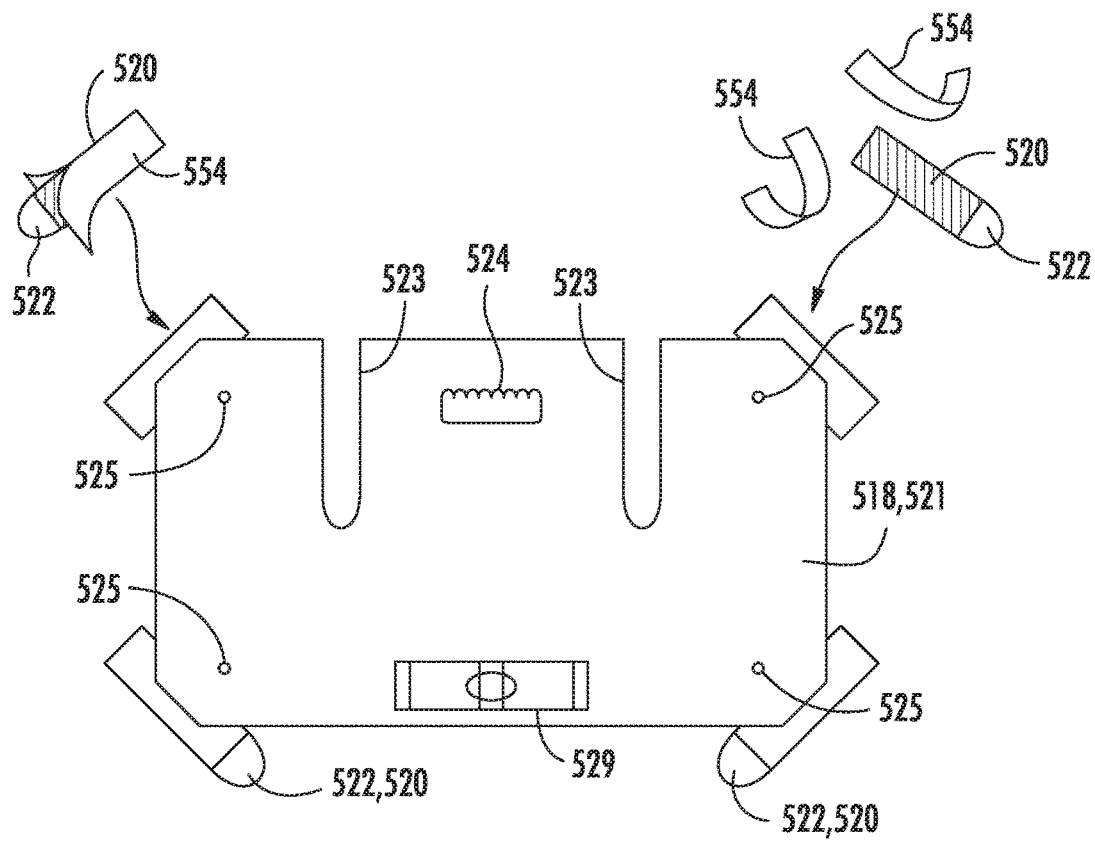
FIG. 22 is a perspective view of an exemplary bracket for the jewelry display of FIG. 20.
Figure 23:
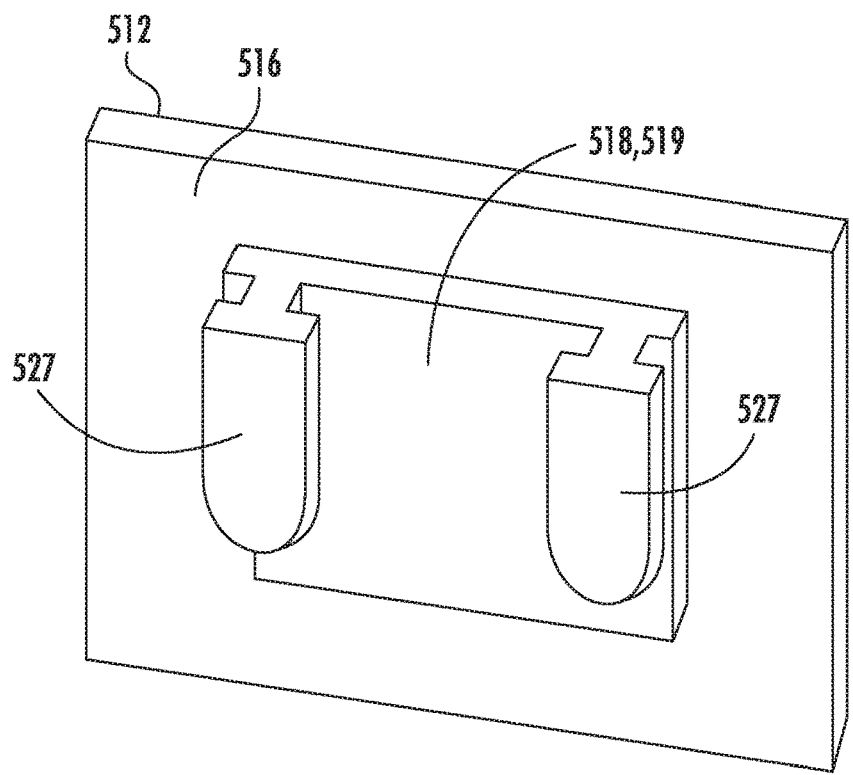
FIG. 23 is a perspective view of an exemplary mount for the jewelry display of FIG. 20.
Figure 24:
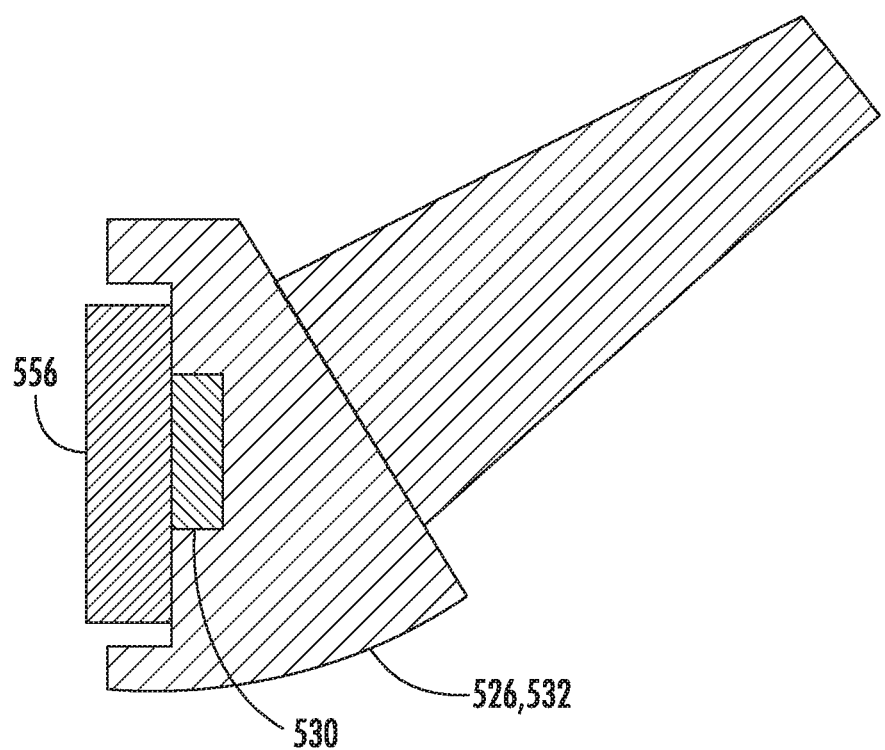
FIG. 24 is a side sectional view of one jewelry fixture showing a protective pad and magnet.

As shown in FIGS. 18-19, a new design for a toy bullet 410 is disclosed. The bullet 410 is cylindrical and hollow. This allows an airstream 412 to pass around and through the bullet 410. The bullet may be defined as having a spin axis 414, a front 416, a center 418 and a back 420. The bullet 410 is constructed to be very light, but also to have a center of gravity 422 behind the physical center 418. This may be accomplished by varying the thickness of the bullet 410 or by placing a cylindrical weight 424 at the back 420.

When launched by a toy gun 426, the bullet 410 is imparted with a spin/spiral. The spin stabilizes the bullet 410 while it is in the air. The bullet 410 is hollow, such that it presents a very small cross-sectional area to the passing air stream 412. This means it has a very low drag coefficient and is able to travel significantly farther. Also, the back 420 of the bullet 410 is slightly weighted. This means that the back 420 of the bullet 410 will tend to drop further down as compared to the front 416 to the bullet 410. Therefore, as the bullet 410 travels in the air, the slight angle of the bullet 410 keeps it flying as it is hitting the air stream 412 and directs the air down while then the bullet 410 flies upward.

The new bullet 410 is safe for use because it is extremely light weight and imparts virtually no energy if it was to strike a person or an object. However, the bullet 410 is of enough size that it is able to be visually spotted flying through the air an therefore fun to watch and play with.

The toy gun 426 imparts the bullet 410 with a forward motion combined with a spinning motion. This overall bullet motion may be achieved in a multitude of ways by one skilled in the art. Preferably the toy gun 426 includes a spring device that can be pulled back and energy stored. The bullet 410 is placed upon a launcher that moves forward and rotates when activated by a trigger.

In another alternative embodiment, the bullet 410 may comprise angled fletching that helps induce a spin when launched in the air.

In another alternative embodiment, the bullet 410 may be shot using magnetic propulsion. The bullet 410 may include strips of magnetic and/or metallic film that are accelerated through a series of electromagnets selectively activated by a controlled electronics chip/board to propel the bullet 410 forward.

In summary, a toy bullet to be shot from a toy gun, comprises: a substantially hollow and cylindrical body defined as comprising a spin axis, a front, a center and a back; and a weight disposed along the back; wherein a center of gravity of the bullet is behind the center towards the back away from the front. The toy gun is capable of projecting the toy bullet forward and with a spiral about the spin axis. The toy bullet may further include a metallic portion. The toy gun may include a means for magnetic propulsion that is associated with the metallic portion on the toy bullet.

The foregoing description of the exemplary embodiments have been presented for the purposes of illustration and description. It is not intended to be exhaustive or to limit the invention to the precise form disclosed. Many modifications and variations are possible in light of the above teaching that others can, by applying current knowledge, readily modify and/or adapt for various applications such specific embodiments without undue experimentation and without departing from the generic concept. Therefore, such adaptations and modifications should and are intended to be comprehended within the meaning and range of equivalents of the disclosed embodiments. It is to be understood that the phraseology or terminology employed herein is for the purpose of description and not of limitation. It is intended that the scope of the invention not be limited by this detailed description, but rather by the claims appended hereto and all equivalents thereto.

Invention 5: Jewelry Organizer

Women all across the world have a problem of organizing and storing their jewelry. Typically they store their jewelry in shelves out of their site. This is problematic as many women own a multitude of jewelry and need to visually see all their pieces before they can make an appropriate selection for the day or for an evening out. Alternatively, women can purchase jewelry stands where they hang their jewelry. However, these jewelry stands take up a lot of space upon a desk or table and are clumsy to use. It is easy to knock the jewelry stand causing all of the jewelry to sway back and forth and sometimes fall off the stand. Accordingly, there exists a need for a new storage and display device that allows one to easily see and also store their jewelry in a space efficient way.

The present invention relates in general to jewelry storage, and in particular to a wall-mountable jewelry display which is configurable and aesthetically pleasing. This invention is generally referred to herein as the "Jewelry Organizer." In the following description of the exemplary embodiments, reference is made to the accompanying drawings that form a part hereof, and in which is shown merely by way of illustration. It is to be understood that other embodiments may be used and structural changes may be made without departing from the scope of the present invention.

As shown in FIGS. 20-24, a wall-mountable jewelry display 510 is attached to a wall 511 and comprises a substantially flat/planar substrate 512. The substrate 512 may be defined as comprising a front surface 514 opposite a back surface 516. The substrate 512 may be formed in a multitude of shapes such as squares, rectangles, circles or any other shape that has sufficient amount of surface area. The substrate 512 may be made from a variety of materials and textures. For instance, the substrate 512 may be made from a metal such as aluminum or steel. Alternatively, the substrate 512 may be made from plastic, composites, cloth, cardboard or any other suitable structure or combination thereof. As will be discussed later, it may be preferable to construct the substrate 512 from steel or other ferromagnetic material.

A wall attachment mechanism 518 may be attached to the back surface 516. The wall attachment mechanism 518 may be removably attachable to the back surface 516 such that the substrate 512 can be removed and replaced with a different substrate 512 while leaving the wall attachment mechanism 518 attached to the wall. This also aids in removing the wall attachment mechanism 518 from the wall by providing access to the mounting features hidden behind the substrate 512. For instance, the wall attachment mechanism 518 can comprise a mount 519 that is permanently attached to the back surface 516 of the substrate 512 by either fastening it, bonding it or other similar means. A bracket 521 is removably attached to the wall 511. The bracket 521 includes receptacles/slots 523 that are designed to receive and accept protrusions 527 formed on the mount 519. The bracket 521 may also include a leveling bubble 529 to aid in installation.

The wall attachment mechanism 518 may include an adhesive 520. The adhesive 520 is shipped with protective linings 554. The adhesive 520 may be removable by pulling on a tab 522 end of the adhesive facilitating its release. The wall attachment mechanism 518 may also include a hook, hanger, nail catch, nail head receiver 524 or other similar means for hanging pictures and paintings upon a wall. In an alternative embodiment, the substrate 512 or wall attachment mechanism 518 includes holes 525 for fasteners to attach to the wall. The holes 525 may be angled downward to help fasteners bite into the wall against the weight of the jewelry display 510. In another preferred embodiment, the wall attachment mechanism 518 may also include adjustment features to allow it to be adjusted after placing. This may be very helpful when leveling the substrate 512 against the wall 511 so that it appears level and true.

A plurality of jewelry fixtures 526 may be removably attachable and positionable to the front surface 514. The jewelry fixtures 526 can be attached in a multitude of methods and ways to the front surface 514 through adhesives, tape, suction cups, engageable slots or other similar means. In a preferred embodiment a magnetic attraction mechanism 528 is attached to and between the front surface and the plurality of jewelry fixtures.

A magnet is a material or object that produces a magnetic field. This magnetic field is invisible but is responsible for the most notable property of a magnet: a force that pulls on other ferromagnetic materials, such as iron, and attracts or repels other magnets. A permanent magnet is an object made from a material that is magnetized and creates its own persistent magnetic field. An everyday example is a refrigerator magnet used to hold notes on a refrigerator door. Materials that can be magnetized, which are also the ones that are strongly attracted to a magnet, are called ferromagnetic (or ferrimagnetic). These include iron, nickel, cobalt, some alloys of rare earth metals, and some naturally occurring minerals such as lodestone. Although ferromagnetic (and ferrimagnetic) materials are the only ones attracted to a magnet strongly enough to be commonly considered magnetic, all other substances respond weakly to a magnetic field, by one of several other types of magnetism.

A permanent magnet 530 may be attached to either or both of the substrate 512 and the plurality of jewelry fixtures 526. In a preferred embodiment the substrate 512 comprises a ferromagnetic substrate 512. Then, each of the plurality of jewelry fixtures 526 comprises a permanent magnet 530 embedded or attached. The permanent magnet 530 attracts the ferromagnetic substrate 512 and allows a user to selectively position the fixtures 526 upon the substrate 512.

In another preferred embodiment, the substrate 512 comprises a magnetic substrate 512. Then, each of the plurality of jewelry fixtures 526 comprises a ferromagnetic insert 530 or even another permanent magnet 530. Care must be taken to ensure that if two magnets are used that the similar poles are not adjacent to each other or otherwise this would create a repelling force. As can be seen by one skilled in the art, various combinations of magnets and ferromagnetic materials may be used to create the magnetic attraction mechanism 528 and these specific teachings are not limiting.

The plurality of jewelry fixtures 526 can include a large range of different structures designed to hold different pieces of jewelry. For instance, a ring fixture 532 holds rings 534. A bracelet fixture 536 holds bracelets 538. An earring fixture 540 holds earrings 542. A necklace fixture 544 holds necklaces 548. A watch fixture 548 holds watches 550. A bowl/shelf fixture 552 can be used to hold a variety of jewelry pieces. As can be seen by one skilled in the art, a multitude of jewelry fixtures may be designed to hold a variety of jewelry pieces.

Additionally, each of the plurality of jewelry fixtures 526 may include a protective pad 556 overtop the magnet 530. The pad 556 may be made from a material that won't mar the front surface 514 such as felt or a soft pad. The pad 556 may also be adhesive backed to aid in manufacturing and assembly. The pad 556 may also be made from a rubber or rubber-like material which increases the friction between the plurality of jewelry fixtures 526 and the front surface 514. An advantage of the present invention is that it is now easy to display one's jewelry and also be able to quickly select particular pieces to wear.

In summary, a wall-mountable jewelry display, comprises: a substantially flat substrate defined as comprising a front surface opposite a back surface; a wall attachment mechanism attached to the back surface; a plurality of jewelry fixtures removably attachable and positionable to the front surface; and a magnetic attraction mechanism attached to and between the front surface and the plurality of jewelry fixtures. The magnetic attraction mechanism may comprise a magnet attached to each of the plurality of jewelry fixtures. The substrate may comprise a ferromagnetic substrate. The substrate may comprise a magnetic substrate. The magnetic attraction mechanism may comprise a plurality of ferromagnetic materials attached to each of the plurality of jewelry fixtures. The wall attachment mechanism may comprise an adhesive pad, a hook, a nail catch or other similar means.

The foregoing description of the exemplary embodiments have been presented for the purposes of illustration and description. It is not intended to be exhaustive or to limit the invention to the precise form disclosed. Many modifications and variations are possible in light of the above teaching that others can, by applying current knowledge, readily modify and/or adapt for various applications such specific embodiments without undue experimentation and without departing from the generic concept. Therefore, such adaptations and modifications should and are intended to be comprehended within the meaning and range of equivalents of the disclosed embodiments. It is to be understood that the phraseology or terminology employed herein is for the purpose of description and not of limitation. It is intended that the scope of the invention not be limited by this detailed description, but rather by the claims appended hereto and all equivalents thereto.

Figure 30:
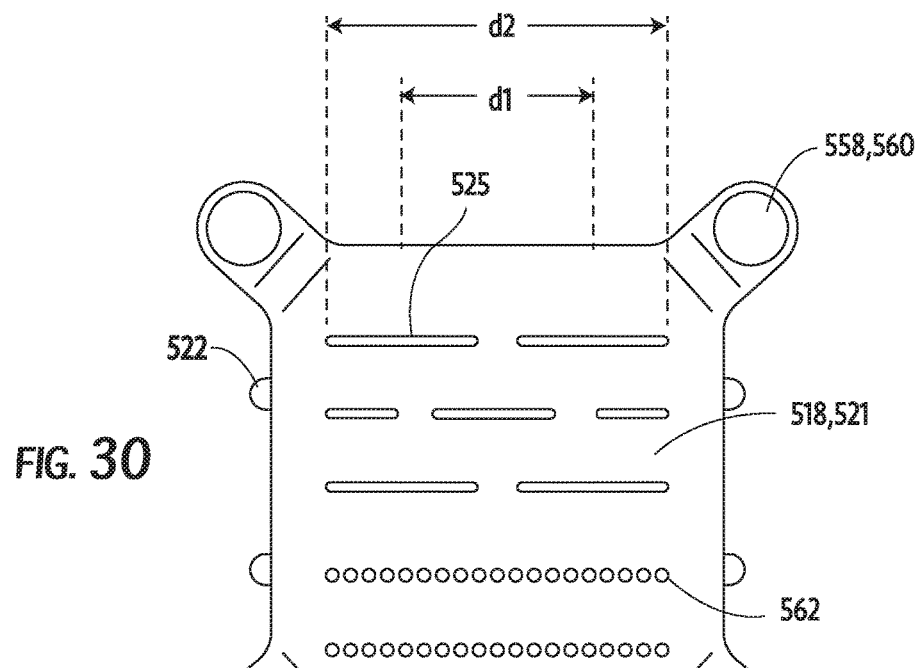
FIG. 30 is a front view of another embodiment of a bracket for a jewelry display.
Figure 31:
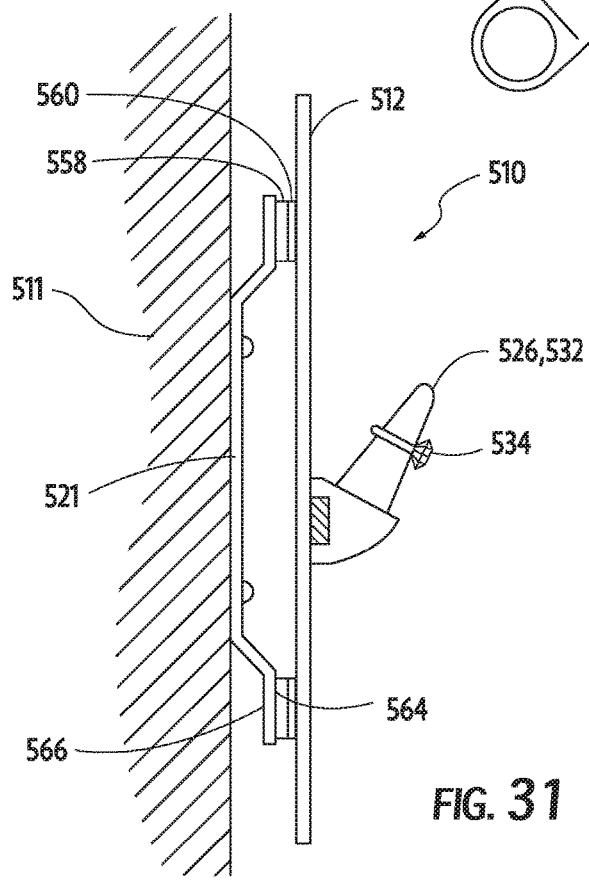
FIG. 31 is a sectional view of another embodiment of a bracket and substrate for a jewelry display as shown in FIG. 30.

Now turning to FIGS. 30 and 31, another embodiment of the wall-mountable jewelry display 510 is shown attached to a wall 511. The substantially flat/planar substrate 512 is made from steel or other ferromagnetic material. In this embodiment the wall attachment mechanism 518 is a bracket 521 that can be affixed to a wall using adhesives, stickers 522 and/or fasteners, nails, screws or the like that fit within holes/slots 525. Preferably the slots 525 could be used such that the fasteners would engage within the studs of the building to create a secure mounting of the bracket 521. A magnet 558 is shown placed at the four corners of the bracket 518. One magnet 558 could be used, two magnets 558 could be used, three magnets 558 could be used or as shown four (or any "n" number) magnets 558 could be used. The magnets 558 may also include a no-slip (rubber) covering 560 or even a slippery covering such as felt or the like that actually aids in adjusting/movement.

As shown in FIG. 30, there is a distance "d1" between the centerline of at least two slots 525, or even one long and continuous slot. To place the bracket 521 anywhere upon a wall, it is customary that studs are placed 16 inches apart. Therefore, as one moves the bracket 521 horizontally, the plurality of slots must always be able to capture at least two studs for a secure and easy mounting. Ideally, the distance d1 is about 16 inches apart. The distance d2 is from the left and right edges of the farthest respective portions of the slots that can be accessed by fasteners and should at least be 32 inches apart. For a smaller version of the present invention the distance d2 should be at least 16 inches apart.

As shown in FIG. 30, the lower slots 525 can also be a plurality of holes 562. Holes 562 may be easier to attach fasteners to as using just two holes prevents rotation of the bracket when secured to a wall.

As shown in FIG. 31, the magnets are disposed on the outer surface 564 of the bracket. This means the magnets are bonded or attached physically to the bracket. As an alternative, the magnets could be disposed on the inner surface 566 of the bracket such that the magnets are being pulled into the bracket when secured to the substrate 512. The outer surface 564 is opposite the inner surface 566. In this manner the adhesive strength securing the magnet 558 to the bracket 521 does not have to be very high. Alternatively, the magnets 558 could be over molded into the bracket 521. This also means the magnets for the plurality of jewelry fixtures may also be over molded.

These new embodiments are easy to mount upon a wall and easy to adjust its final position such that leveling or adjusting the final location is relatively easy. First, the location of the bracket 521 is generally determined. Then fasteners are used through the slots/holes 525 to secure the bracket 521 to the studs within the building. The bracket 521 can be generally leveled just with the eye as its exact placement is not critical. Then the substrate 512 is simply placed against the magnets 558. The attraction of the magnets 558 are greater in force then the magnets 530 used within each jewelry fixture. In particular, the magnets 558 are at least 2×, 3×, 4×, 5×, 10× or "n" times more the strengths of the magnets 530. The substrate 512 can then be moved into its final position that is level or looks right to the user. Because the substrate 512 can be moved and repositioned, the substrate can be adjusted easily to a user's preference. Also, different substrates 512 can easily be exchanged or even removed for cleaning if desired. As can be seen, attaching the bracket 521 is easy such that even those without much experience can accomplish it. As with the previous embodiments, a range of jewelry fixtures 526 can be used on the substrate 512.

Invention 6: Pocket Jeans

Cargo pants are a common type of pants worn worldwide. Cargo pants are pants with externally mounted pockets along the thigh area of the pant. The advantage of cargo pants is that it allows the user to carry a significant amount of stuff. However, cargo pants have a certain look that many people find undesirable. However, jeans are almost universally accepted articles of clothing. Jeans are made of denim and are typically bluish in color. However, jeans do not allow one to carry as much stuff as cargo pants. Accordingly, there is a need for new type of pant that allows one to carry more stuff yet does not look like a cargo pant.

The present invention relates in general to clothing, and in particular to a pair of pants with a pocket integrated in the calf section and/or the thigh section accessible along a seam. This invention is generally referred to herein as the "Pocket Jeans." In the following description of the exemplary embodiments, reference is made to the accompanying drawings that form a part hereof, and in which is shown merely by way of illustration. It is to be understood that other embodiments may be used and structural changes may be made without departing from the scope of the present invention.

Figure 25:
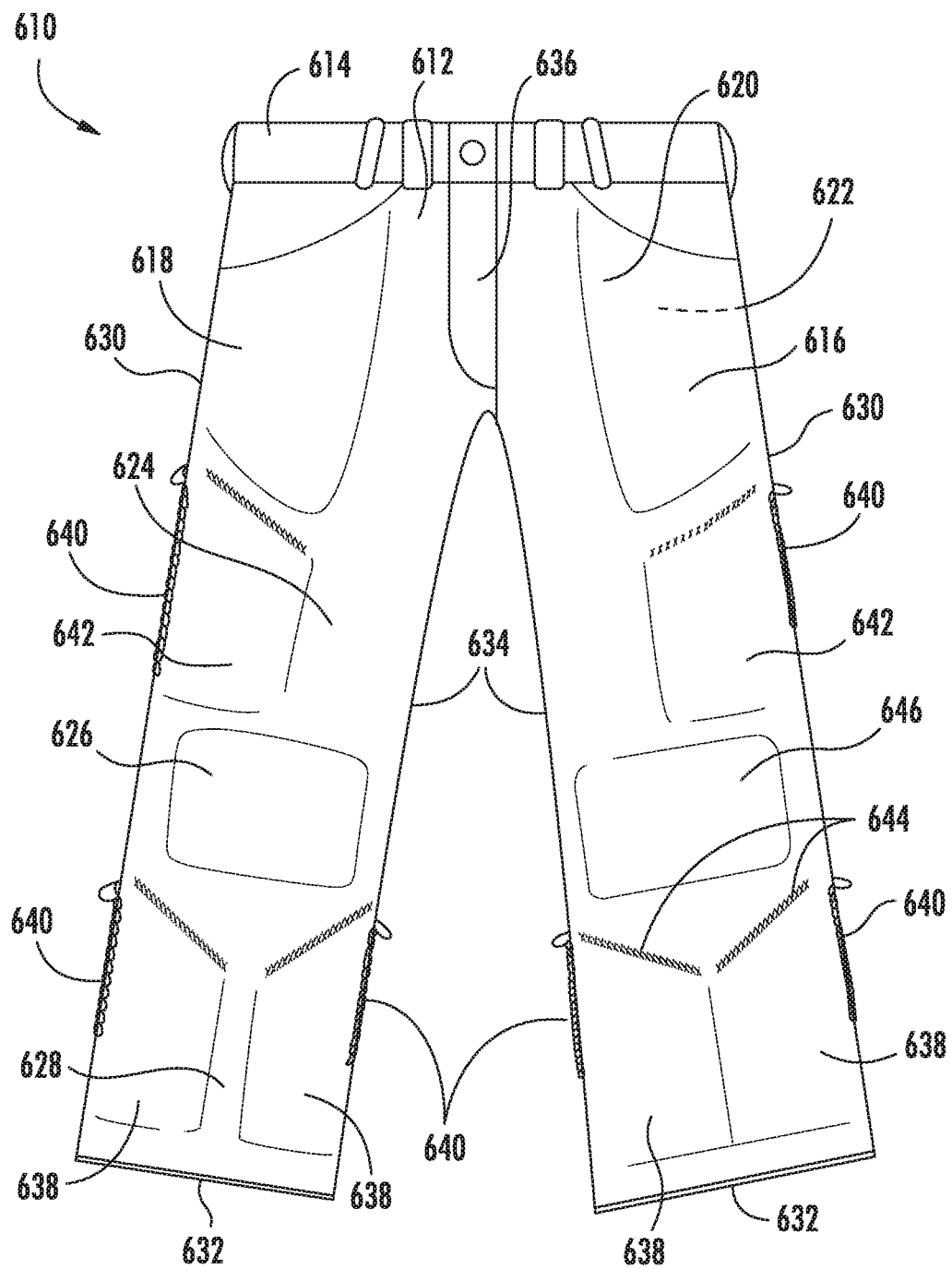
FIG. 25 is a front view of an exemplary pocket jeans embodying the present invention.
Figure 26:
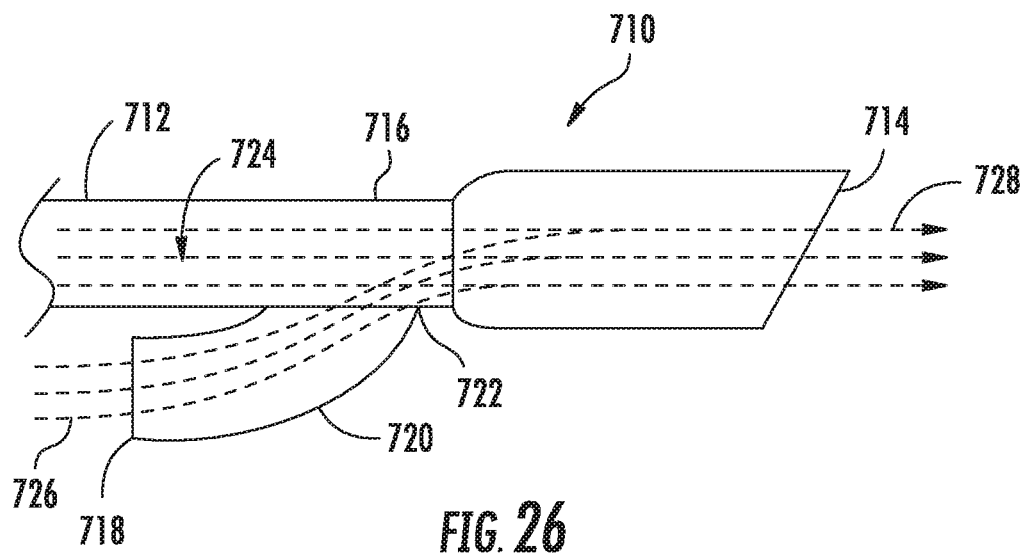
FIG. 26 is a side sectional view of an exemplary ram-air exhaust embodying the present invention.
Figure 27:
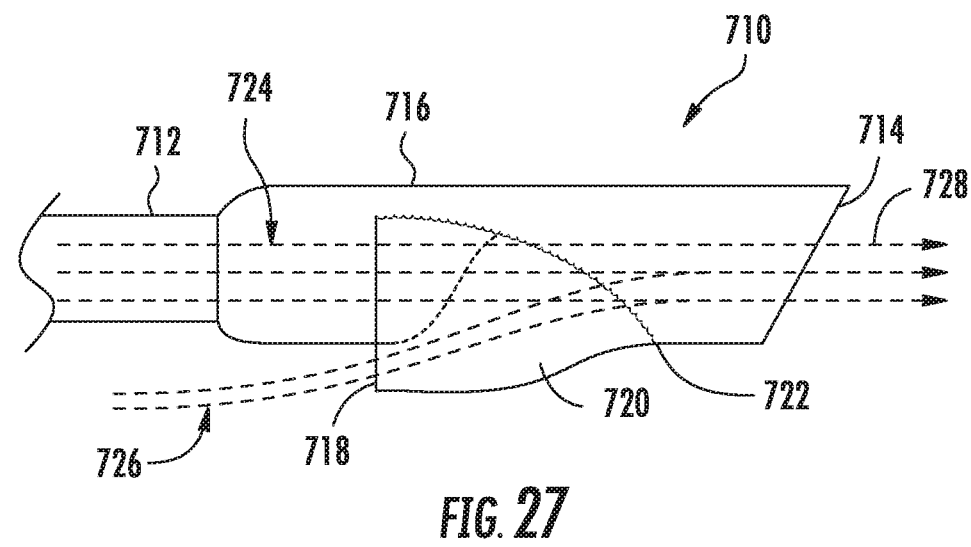
FIG. 27 is a side sectional view of another exemplary ram-air exhaust embodying the present invention.
Figure 28:
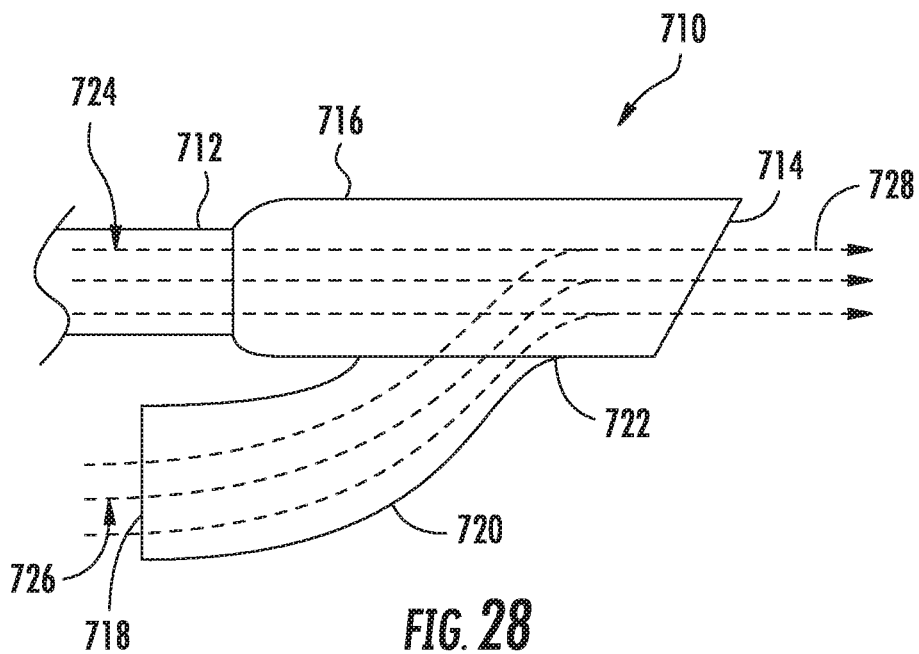
FIG. 28 is a side sectional view of another exemplary ram-air exhaust embodying the present invention.
Figure 29:
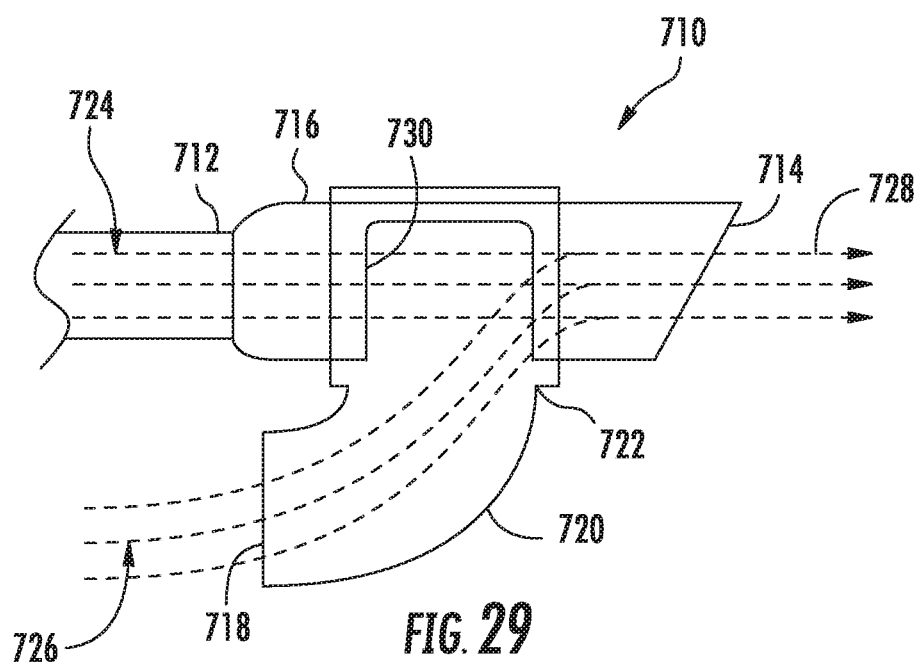
FIG. 29 is a side sectional view of another exemplary ram-air exhaust embodying the present invention.

As shown in FIG. 25, a pair of pants 610 is disclosed comprising a top part 612 including a waistband 614. A left leg 616 and right leg 618 extend downward from the top part 612. Each leg includes a front side 620 and a back side 622 connected together. Each leg is defined as comprising a thigh portion 624 disposed above a knee portion 626 disposed above a calf portion 628.

A pair of outside seams 630 each start at the waistband 614 and extend to a distal end 632 of each leg 616, 618. A pair of inside seams 634 each extend from a crotch 636 of the top part 612 to the distal end 632 of each leg 616, 618.

At least one pocket 638 may be disposed in the calf portion 628. The pocket 638 comprises a zippered opening 640 disposed along either the outside seam 630 or inside seam 634. At least one pocket 642 may be disposed in the thigh portion 624. The pocket 642 comprises a zippered opening 640 disposed along the outside seam 630. The pockets 638, 642 may also have stitching 644 along the top to help attach it to the pants and provide structural support.

In alternative embodiments, the pants 610 may also have knee pads 646 integrated on the inside of the pants. Knee pads 646 can help prevent premature wear of the knees. Also, the knee pads 646 can be formed from a hard shell with a padding insert for comfort.

In summary, a pair of pants comprises: a top part including a waistband; a left and right legs extending downward from the top part, each leg having front side and a back side connected together, and each leg defined as comprising a thigh portion above a knee portion above a calf portion; a pair of outside seams each starting at the waistband and running to a distal end of each leg; a pair of inside seams each extending from a crotch of the top part to the distal end of each leg; and at least one pocket disposed in the calf portion, the pocket comprising a zippered opening disposed along either the outside or inside seam.

The foregoing description of the exemplary embodiments have been presented for the purposes of illustration and description. It is not intended to be exhaustive or to limit the invention to the precise form disclosed. Many modifications and variations are possible in light of the above teaching that others can, by applying current knowledge, readily modify and/or adapt for various applications such specific embodiments without undue experimentation and without departing from the generic concept. Therefore, such adaptations and modifications should and are intended to be comprehended within the meaning and range of equivalents of the disclosed embodiments. It is to be understood that the phraseology or terminology employed herein is for the purpose of description and not of limitation. It is intended that the scope of the invention not be limited by this detailed description, but rather by the claims appended hereto and all equivalents thereto.

Invention 7: Ram-Air Exhaust

It is well known within car designers and hotrod shops to create a ram-air for the intake of the engine. As the vehicle moves forward, pressure is built up from the air it is passing through. This pressure can be channeled to create a pressure for the intake of the engine, which increases horsepower. Horsepower is increased because the air entering the engine is being forced by the air pressure. More air is then delivered into the combustion chamber which means more power can be generated.

Pressure buildup on the exhaust side of the engine also reduces horsepower. The engine loses horsepower by requiring it to pump it through the exhaust system. Accordingly, many car designers have created low restriction exhaust paths that minimize the pressure buildup along the exhaust. However, none have realized that the same air used to pressurize the intake air can be used to help evacuate exhaust out the exhaust system. Accordingly, there exists a need for a new exhaust device that helps evacuate exhaust fumes out of the exhaust system.

The present invention relates in general to internal combustion engine enhancements, and in particular to an exhaust that decreases backpressure of exiting exhaust using the high velocity air created when moving forward. This invention is generally referred to herein as the "Ram-Air Exhaust." In the following description of the exemplary embodiments, reference is made to the accompanying drawings that form a part hereof, and in which is shown merely by way of illustration. It is to be understood that other embodiments may be used and structural changes may be made without departing from the scope of the present invention.

As shown in FIGS. 26-29, a ram-air exhaust 710 for an internal combustion engine is mountable upon a vehicle. The exhaust system 710 may be disposed along any portion of the existing exhaust system but is preferably mounted at the very end of the exhaust path right before it enters the atmospheric air. The ram-air exhaust 710 comprises an exhaust inlet 712 connected to an exhaust outlet 714 by an exhaust passageway 716.

An outside air inlet 718 is configured to face the forward direction the vehicle is traveling. Alternatively, the outside air inlet 718 may face any direction or location where there is a high distribution of pressure when the vehicle is moving forward. This may include directions not necessarily directly forward facing but near other structures that generate pressure in varying directions. A cowl induction hood generates pressure at the base of the windshield in the opposite direction of travel due to the slope of the front windshield interacting with the air stream. The present invention may work in a similar manner by facing varying directions that have increased pressure due to the structure of the vehicle.

The outside air inlet 718 has a second passageway 720 that merges/connects with the exhaust passageway 716. The connection 722 between the two passageways should be made to reduce pressure loss. This means that the connection 722 should be aerodynamically smooth and free flowing to reduce any loss of pressure.

The streams of air can be seen in the figures where the exhaust fumes 724 are merged with the outside air flow 726. When the vehicle is moving at a fast pace, the velocity of the outside air flow 726 will be greater than the velocity of the exhaust fumes 724. The combined exiting flow 728 is therefore increased in velocity. This increased combined exiting flow 728 helps to lower the pressure needed for the engine to push the exhaust fumes 724 out the exhaust system and therefore creates more horsepower.

To further increase the effectiveness of the device, the area of the exhaust outlet 714 can be smaller than the combined area of the exhaust inlet 712 and outside air inlet 718. Any time a fluid flowing in a pipe reaches an area of smaller cross-section, it speeds up and the pressure drops. This is called the Venturi effect. This pressure drop can help to suck the exhaust fumes 724 out of the exhaust system. Accordingly, the cross-sectional areas of the pipes can be sized to increase performance by utilizing the Venturi effect. For instance, the outside air flow 726 can be scooped up with 20 square inches of area to then be channeled down to 10 square inches. As the area decreases, the speed of the air increases. This means then that the reduction in back pressure is even higher as a Venturi effect has been created.

To facilitate ease of installation, the invention disclosed herein can be formed into a single exhaust tip. It is customary for people to replace or change exhaust tips. The present invention can be easily utilized by an exhaust tip that incorporates the present invention.

In another exemplary embodiment of the present invention, the outside air inlet 718 may be rotatably and/or movably adjustable and fixable relative to the exhaust passageway 716. This may facilitate installation of the invention and allow the user to fine tune the overall performance. The exhaust passageway 716 may include a large aperture 730 that facilitates the different positioning of the outside air inlet 718. A clamp, bracket, fastener or set screw can then be used to secure the rotatable outside air inlet 718 to the exhaust passageway 716.

In summary, an exhaust for an internal combustion engine to be mountable upon a vehicle comprises: an exhaust inlet; an exhaust outlet connected to the exhaust inlet through an exhaust passageway; an outside air inlet disposed open to a forward direction of the vehicle or a high pressure area; and a second passageway connecting the outside air inlet to the exhaust passageway.

The foregoing description of the exemplary embodiments have been presented for the purposes of illustration and description. It is not intended to be exhaustive or to limit the invention to the precise form disclosed. Many modifications and variations are possible in light of the above teaching that others can, by applying current knowledge, readily modify and/or adapt for various applications such specific embodiments without undue experimentation and without departing from the generic concept. Therefore, such adaptations and modifications should and are intended to be comprehended within the meaning and range of equivalents of the disclosed embodiments. It is to be understood that the phraseology or terminology employed herein is for the purpose of description and not of limitation. It is intended that the scope of the invention not be limited by this detailed description, but rather by the claims appended hereto and all equivalents thereto.

What is claimed is:

1. A jewelry display, comprising:
    a ferromagnetic planar substrate having a front surface opposite a back surface;
    a bracket configured to be attached to a wall, the bracket comprising at least one bracket magnet, wherein the at least one bracket magnet is a permanent magnet, and wherein the back surface of the ferromagnetic planar substrate is configured to removably attach to the bracket only due to the magnetic force of the at least one bracket magnet attracting the ferromagnetic planar substrate; and
    a plurality of jewelry fixtures configured to be removably attached to the front surface of the ferromagnetic planar substrate, each jewelry fixture comprising at least one permanent fixture magnet and a jewelry holding structure, wherein the at least one permanent fixture magnet of each jewelry fixture is magnetically attracted to the ferromagnetic planar substrate.

2. The jewelry display of claim 1, wherein the at least one bracket magnet comprises at least four bracket magnets.

3. The jewelry display of claim 1, including a plurality of horizontally extending slots disposed through the bracket.

4. The jewelry display of claim 3, wherein a farthest left and right ends of the slots are at least 16 inches apart.

5. The jewelry display of claim 3, wherein a farthest left and right ends of the slots are at least 32 inches apart.

6. The jewelry display of claim 1, including a plurality of holes through the bracket and horizontally disposed next to one another.

7. The jewelry display of claim 6, wherein a farthest left and right hole of the plurality of holes are at least 16 inches apart.

8. The jewelry display of claim 6, wherein a farthest left and right hole of the plurality of holes are at least 32 inches apart.

9. The jewelry display of claim 1, wherein the at least one bracket magnet is attached to an outer surface of the bracket, the outer surface configured to face away from the wall.

10. The jewelry display of claim 1, wherein the at least one bracket magnet is attached to an inner surface of the bracket, the inner surface configured to face towards the wall.

11. The jewelry display of claim 1, wherein the at least one bracket magnet is over molded within the bracket.

12. The jewelry display of claim 1, wherein the bracket comprises a removable adhesive pad configured to attach the bracket to the wall.

13. The jewelry display of claim 1, wherein the jewelry holding structure comprises a ring fixture, a bracelet fixture, an earring fixture, a necklace fixture, a watch fixture, a bowl fixture or a shelf fixture.

14. The jewelry display of claim 1, wherein each of the plurality of jewelry fixtures comprise a protective pad configured to be disposed between the at least one permanent magnet and the ferromagnetic planar substrate.

15. The jewelry display of claim 14, wherein the protective pad comprises a rubber material or a rubber-like material.

16. The jewelry display of claim 1, wherein the at least one bracket magnet is at least 2 times as powerful as the at least one permanent fixture magnet.

17. The jewelry display of claim 1, wherein the at least one bracket magnet is at least 5 times as powerful as the at least one permanent fixture magnet.

18. The jewelry display of claim 1, wherein the at least one bracket magnet is at least 10 times as powerful as the at least one permanent fixture magnet.

* * * * *